US012654717B2

(12) United States Patent
Tulpule

(10) Patent No.: US 12,654,717 B2
(45) Date of Patent: Jun. 16, 2026

(54) METHODS AND SYSTEMS FOR CONTROLLING GEAR SHIFTS BASED ON FUTURE TRAJECTORY INFORMATION

(71) Applicant: Waymo LLC, Mountain View, CA (US)

(72) Inventor: Pinak J. Tulpule, Fremont, CA (US)

(73) Assignee: Waymo LLC, Mountain View, CA (US)

( * ) Notice: Subject to any disclaimer, the term of this patent is extended or adjusted under 35 U.S.C. 154(b) by 216 days.

(21) Appl. No.: 18/397,849

(22) Filed: Dec. 27, 2023

(65) Prior Publication Data

US 2025/0214597 A1 Jul. 3, 2025

(51) Int. Cl.
B60W 50/00 (2006.01)
B60W 30/14 (2006.01)
(Continued)

(52) U.S. Cl.
CPC ...... B60W 50/0097 (2013.01); B60W 30/143 (2013.01); B60W 30/18163 (2013.01);
(Continued)

(58) Field of Classification Search
CPC ........... B60W 50/0097; B60W 30/143; B60W 30/18163; B60W 60/001; B60W 2510/1005; B60W 2520/105; B60W 2530/10; B60W 2530/209; B60W 2552/15; B60W 2710/1005; B60W 2300/125;
(Continued)

(56) References Cited

U.S. PATENT DOCUMENTS 6,174,262 B1 1/2001 Ohta
6,278,928 B1 8/2001 Aruga
(Continued)

FOREIGN PATENT DOCUMENTS

CN 111350812 A 6/2020
CN 109896471 B 9/2020
(Continued)

OTHER PUBLICATIONS

Dwivedi et aal., "Automation in Gear Shifting Mechanism", Smart Moves Journal IJOScience 4(5):7 (2018), https://www.researchgate.net/publication/343588593_AUTOMATION_IN_GEAR_SHIFTING_MECHANISM.

*Primary Examiner* — Tisha D Lewis
(74) *Attorney, Agent, or Firm* — McDonnell Boehnen Hulbert & Berghoff LLP

(57) ABSTRACT

Techniques for controlling gear shifts based on future trajectory information are presented herein. A vehicle computing system may receive sensor data representing an environment of the vehicle during autonomous navigation of a path and determine, based on the sensor data, the vehicle is approaching a predefined situation positioned along the path. The computing system may then estimate a future acceleration or speed associated with navigation of the predefined situation by the vehicle. The computing system may determine, based on the future acceleration or speed and a current acceleration of the vehicle, whether to perform a gear shift prior to navigation of the predefined situation by the vehicle, and control the vehicle based on determining whether to perform the gear shift prior to navigation of the predefined situation.

20 Claims, 15 Drawing Sheets

(51) Int. Cl.

| | |
|---|---|
| *B60W 30/18* | (2012.01) |
| *B60W 60/00* | (2020.01) |
| *F16H 59/44* | (2006.01) |
| *F16H 59/46* | (2006.01) |
| *F16H 59/48* | (2006.01) |
| *F16H 59/52* | (2006.01) |
| *F16H 59/66* | (2006.01) |
| *F16H 61/02* | (2006.01) |
| *F16H 61/00* | (2006.01) |

(52) U.S. Cl.
CPC ........... *B60W 60/001* (2020.02); *F16H 59/44* (2013.01); *F16H 59/46* (2013.01); *F16H 59/48* (2013.01); *F16H 59/52* (2013.01); *F16H 59/66* (2013.01); *F16H 61/0213* (2013.01); *B60W 2510/1005* (2013.01); *B60W 2520/105* (2013.01); *B60W 2530/10* (2013.01); *B60W 2530/209* (2020.02); *B60W 2552/15* (2020.02); *B60W 2710/1005* (2013.01); *F16H 2059/663* (2013.01); *F16H 2061/0087* (2013.01)

(58) Field of Classification Search
CPC ........... B60W 2552/20; B60W 2555/20; F16H 59/44; F16H 59/46; F16H 59/48; F16H 59/52; F16H 59/66; F16H 61/0213; F16H 2059/663; F16H 2061/0087; F16H 2059/666
See application file for complete search history.

(56) References Cited

U.S. PATENT DOCUMENTS

| | | | | |
|---|---|---|---|---|
| 7,653,469 | B2 | 1/2010 | Bai | |
| 7,912,615 | B2 | 3/2011 | Lindgren | |
| 7,972,244 | B2 | 7/2011 | Gierling | |
| 10,394,237 | B2 | 8/2019 | Xu | |
| 11,655,893 | B1 * | 5/2023 | Pertsel | G06V 10/95 701/59 |
| 2002/0042672 | A1 | 4/2002 | Shiiba | |
| 2008/0234905 | A1 | 9/2008 | Steen | |
| 2012/0310499 | A1 * | 12/2012 | Kiefer | F16H 61/0213 701/65 |
| 2019/0049260 | A1 * | 2/2019 | Gaither | B60W 40/00 |
| 2019/0211919 | A1 * | 7/2019 | Nishimura | F16H 59/66 |
| 2023/0089742 | A1 | 3/2023 | Sun | |
| 2025/0162580 | A1 * | 5/2025 | Borhan | F16H 61/0213 |
| 2025/0196867 | A1 * | 6/2025 | Ham | B60W 60/001 |

FOREIGN PATENT DOCUMENTS

| | | | | |
|---|---|---|---|---|
| CN | 112706775 | A * | 4/2021 | ........... B60W 30/19 |
| CN | 114941710 | A | 8/2022 | |
| SE | 1250348 | A1 * | 10/2013 | ........... B60W 10/11 |
| WO | 2022062572 | A1 | 3/2022 | |

* cited by examiner

250

270

204A

204B

202

210

208

214

212

260

206

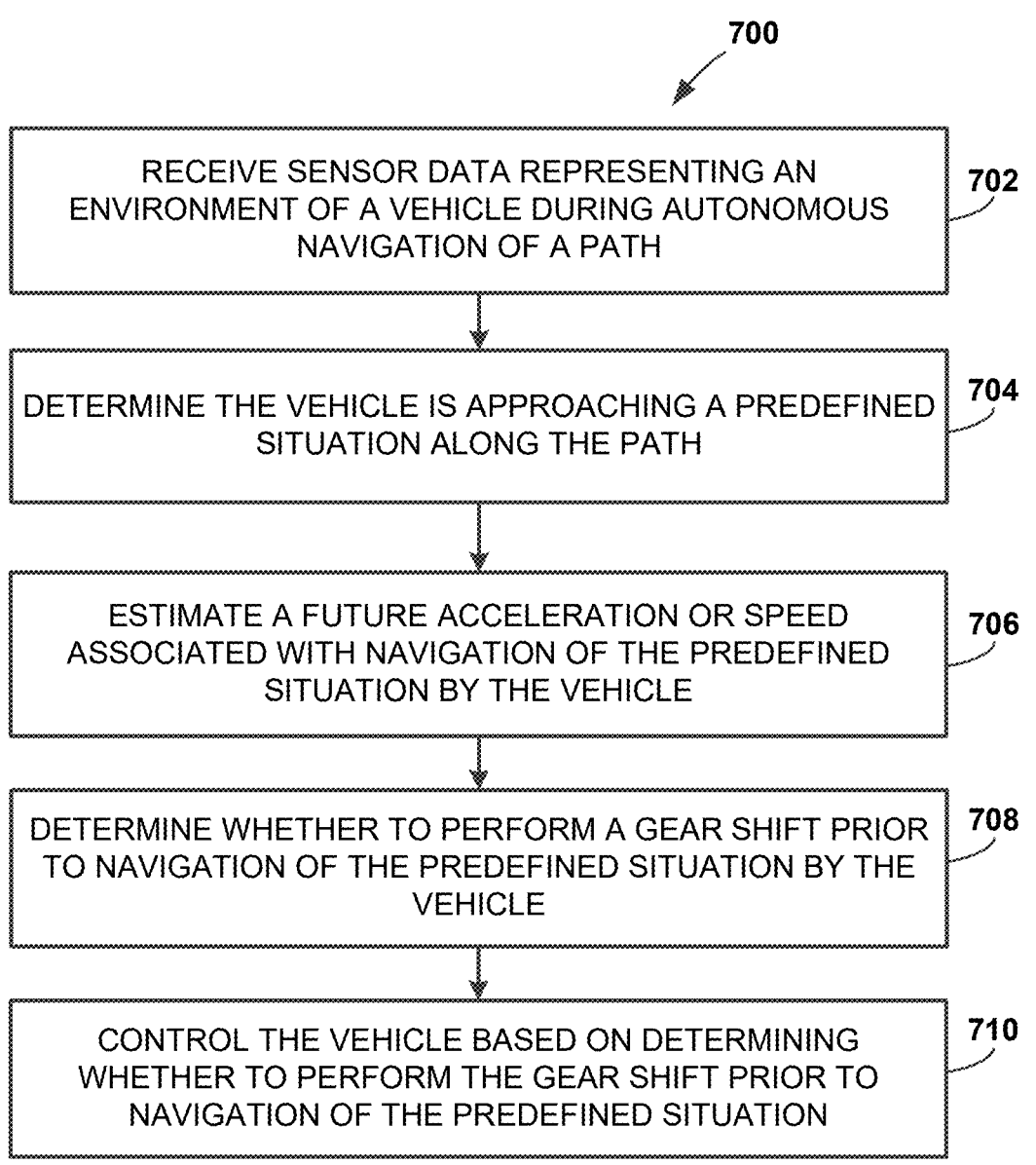

700

RECEIVE SENSOR DATA REPRESENTING AN ENVIRONMENT OF A VEHICLE DURING AUTONOMOUS NAVIGATION OF A PATH — 702

DETERMINE THE VEHICLE IS APPROACHING A PREDEFINED SITUATION ALONG THE PATH — 704

ESTIMATE A FUTURE ACCELERATION OR SPEED ASSOCIATED WITH NAVIGATION OF THE PREDEFINED SITUATION BY THE VEHICLE — 706

DETERMINE WHETHER TO PERFORM A GEAR SHIFT PRIOR TO NAVIGATION OF THE PREDEFINED SITUATION BY THE VEHICLE — 708

CONTROL THE VEHICLE BASED ON DETERMINING WHETHER TO PERFORM THE GEAR SHIFT PRIOR TO NAVIGATION OF THE PREDEFINED SITUATION — 710

FIG. 7

METHODS AND SYSTEMS FOR CONTROLLING GEAR SHIFTS BASED ON FUTURE TRAJECTORY INFORMATION

BACKGROUND

Advancements in computing, sensors, and other technologies have enabled vehicles to safely navigate between locations autonomously, i.e., without requiring input from a human driver. By processing sensor measurements of the surrounding environment in near real-time, an autonomous vehicle can safely transport passengers or objects (e.g., cargo) between locations while avoiding obstacles, obeying traffic requirements, and performing other actions that are typically conducted by the driver. Shifting both decision-making and control of the vehicle over to vehicle systems can allow the vehicle's passengers to devote their attention to tasks other than driving. Some situations, however, can arise during navigation that may impact a vehicle's ability to navigate toward a destination.

SUMMARY

Example embodiments relate to techniques and systems for controlling gear shifts based on future trajectory information. A computing system on a semi-truck or another type of vehicle may perform disclosed techniques to automatically optimize gear changes based on upcoming navigation scenarios detected via sensor data, thereby improving fuel efficiency and overall performance of the vehicle.

In one aspect, a method is described. The method involves receiving, at a computing system coupled to a vehicle, sensor data representing an environment of the vehicle during autonomous navigation of a path. The sensor data is received from at least one sensor coupled to the vehicle. The method further involves determining, based on the sensor data, the vehicle is approaching a predefined situation positioned along the path and estimating a future acceleration or speed associated with navigation of the predefined situation by the vehicle. The method also involves determining, based on the future acceleration or speed and a current acceleration of the vehicle, whether to perform a gear shift prior to navigation of the predefined situation by the vehicle and controlling the vehicle based on determining whether to perform the gear shift prior to navigation of the predefined situation.

In another aspect, a system is described. The system includes a sensor and a computing device. The computing device is configured to receive sensor data representing an environment of the vehicle during autonomous navigation of a path. The sensor data is received from at least one sensor coupled to the vehicle. The computing device is further configured to determine, based on the sensor data, the vehicle is approaching a predefined situation positioned along the path, estimate a future acceleration or speed associated with navigation of the predefined situation by the vehicle, determine, based on the future acceleration or speed and a current acceleration of the vehicle, whether to perform a gear shift prior to navigation of the predefined situation by the vehicle, and control the vehicle based on determining whether to perform the gear shift prior to navigation of the predefined situation.

In yet another aspect, a non-transitory computer-readable medium is described. The non-transitory computer-readable medium is configured to store instructions, that when executed by a computing system comprising one or more processors, causes the computing system to perform operations. The operations involve receiving sensor data representing an environment of a vehicle during autonomous navigation of a path. The sensor data is received from at least one sensor coupled to the vehicle. The operations also involve determining, based on the sensor data, the vehicle is approaching a predefined situation positioned along the path and estimating a future acceleration or speed associated with navigation of the predefined situation by the vehicle. The operations also involve determining, based on the future acceleration or speed and a current acceleration of the vehicle, whether to perform a gear shift prior to navigation of the predefined situation by the vehicle and controlling the vehicle based on determining whether to perform the gear shift prior to navigation of the predefined situation.

These as well as other aspects, advantages, and alternatives will become apparent to those of ordinary skill in the art by reading the following detailed description, with reference, where appropriate, to the accompanying drawings.

BRIEF DESCRIPTION OF THE DRAWINGS

FIG. 6 is a flowchart of a method for universal spectrum utilization exchange for RFI mitigation and avoidance, according to example embodiments.

FIG. 7 is a flowchart of a method for controlling gear shifts based on future trajectory information, according to example embodiments.

DETAILED DESCRIPTION

Figure 1:
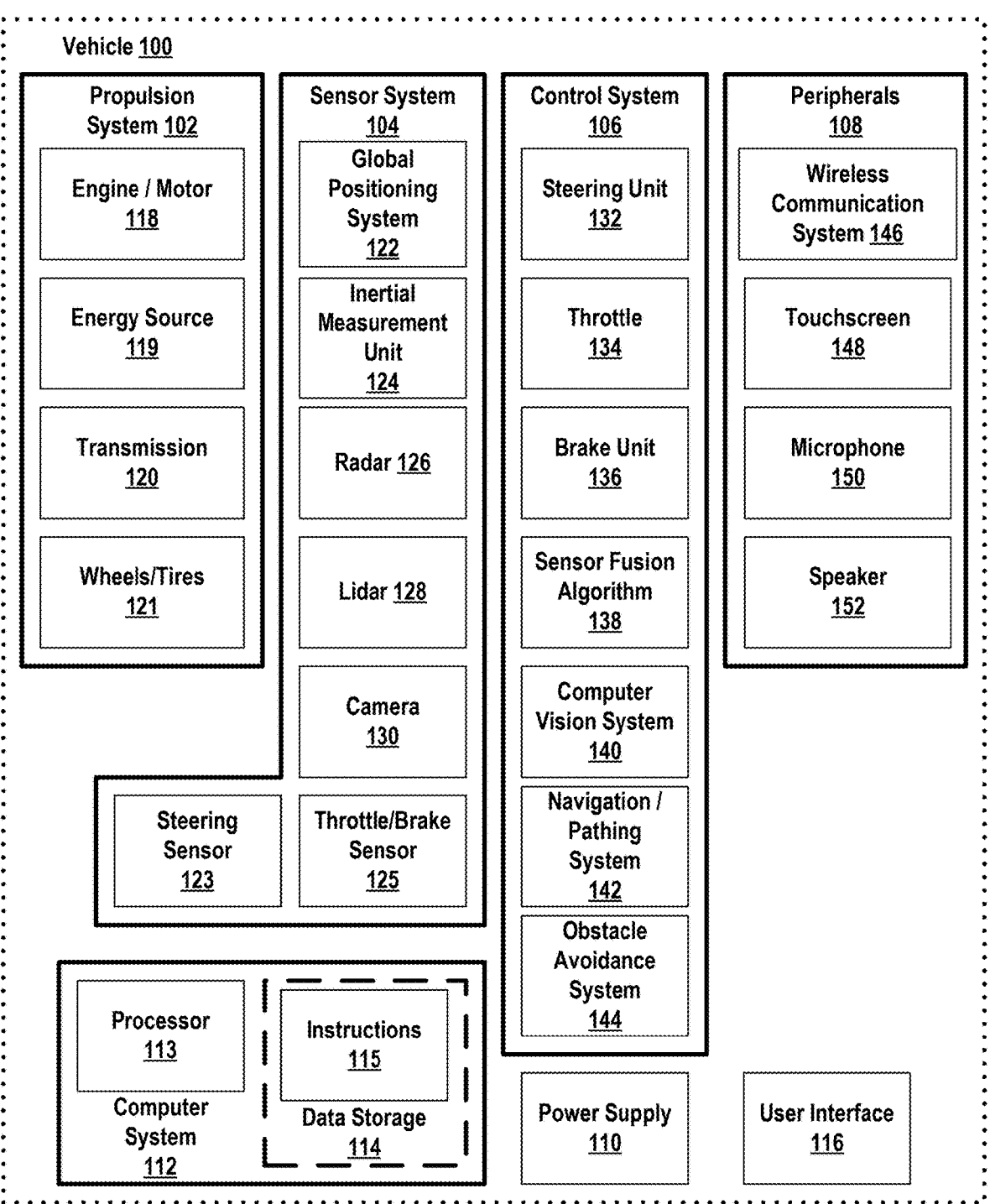
FIG. 1 is a functional block diagram illustrating a vehicle, according to example embodiments.

Example methods and systems are contemplated herein. Any example embodiment or feature described herein is not necessarily to be construed as preferred or advantageous over other embodiments or features. Further, the example embodiments described herein are not meant to be limiting. It will be readily understood that certain aspects of the disclosed systems and methods can be arranged and combined in a wide variety of different configurations, all of which are contemplated herein. In addition, the particular arrangements shown in the figures should not be viewed as limiting. It should be understood that other embodiments might include more or less of each element shown in a given figure. Additionally, some of the illustrated elements may be combined or omitted. Yet further, an example embodiment may include elements that are not illustrated in the figures.

Trucks and other types of vehicles commonly integrate a transmission system to precisely regulate speed during navigation. The transmission system can be manual, automatic, or a hybrid combination of both modalities. In manual transmissions, the driver manually shifts gears using a gear shifter and clutch pedal. For instance, low gears are utilized for enhanced torque during starts or heavy loads, while high gears are engaged for travel at higher speeds. Automatic transmissions, in contrast, operate autonomously by employing a torque converter or clutch and planetary gears to dynamically adjust gears based on driving conditions. As an integral component of automatic transmissions, the torque converter or clutch facilitates engine operation during vehicular standstill and adjusts torque multiplication as necessary. In some instances, both manual and automatic transmissions may include a Transmission Control Unit (TCU), which is capable of optimizing gear shifting based on sensor inputs representing engine load and vehicle speed, etc.

Gear shifts and torque significantly influence the performance of vehicles, particularly trucks. In particular, the effective management of power, efficiency, and overall operation can depend on the interplay of gear shifts and torque. Trucks and other large vehicles typically feature automated manual transmissions that use a controller to select gears to align with the truck's speed and load demand in relation to engine capability. The transmission assembly encompasses multiple gears of varying sizes with each gear providing distinct gear ratios, establishing a correlation between engine and wheel speed.

During gear shifts in a truck, the alteration in gear ratio impacts the torque delivered to the wheels. Torque, representative of the engine's rotational force, plays a critical role in vehicle speed and acceleration. Lower gears yield heightened torque, which can be used for acceleration, hill climbing, or heavy load hauling. Conversely, higher gears facilitate higher speeds by reducing the engine's revolutions per minute (RPM) output while maintaining a consistent pace.

The correlation between gear shifts and torque directly impact the performance of trucks and other types of vehicles. Whether initiating motion from a standstill, accelerating to overtake another vehicle, or ascending a steep incline, the controller shifts the truck into lower gears to augment torque, enabling the engine to operate at higher RPMs and surmount resistance from the load or incline. Conversely, when cruising on flat surfaces, the controller shifts to higher gears, aligning the engine's RPM with the truck's speed and conserving fuel. An optimized transmission controller may achieve a delicate balance that ensures the truck operates optimally under diverse conditions to meet driver demands for torque, speed, efficiency, drivability, and comfort.

Advancements in computing, sensors, and other technologies have enabled vehicles, including autonomous semi-trucks, to navigate safely without human intervention. By processing sensor measurements of the surrounding environment in near real-time, autonomous vehicles can transport passengers or cargo while adhering to traffic rules and avoiding obstacles. The absence of a well-optimized transmission controller in autonomous vehicles, particularly large ones like semi-trucks, can lead to improper manipulation of gear shifts and torque. This deficiency may result in diminished acceleration, heightened fuel consumption, or potential damage to the engine or transmission, underscoring the critical role of an optimized transmission controller in balancing power and efficiency across diverse conditions.

Example embodiments presented herein involve techniques for implementing automatic gear shifts of an autonomous semi-truck or another type of vehicle based on the surrounding environment and other parameters. Such techniques involve using sensor data to determine future trajectory needs and determining whether a gear shift is needed prior to the semi-truck performing the future trajectory navigation. A vehicle controller or another computing system may perform disclosed techniques during navigation to optimize gear changes based on dynamic changes detected and identified in the surrounding environment. Vehicle systems can perform disclosed techniques continuously to adjust gears or other vehicle behaviors (e.g., acceleration or speed) to accommodate upcoming navigation scenarios.

Future planning via disclosed techniques can reduce sudden acceleration and gear changes, which will limit vehicle speed drops and possible delays with the vehicle reaching the desired acceleration. In addition, disclosed techniques enable smooth vehicle speed that can result in higher fuel economy and smoother acceleration. In some cases, an autonomous truck or another type of vehicle may avoid a gear downshift and the subsequent gear up-shift when vehicle speed stabilizes as a result of performing disclosed techniques, which further helps increase the fuel economy and overall smoothing of vehicle performance. In addition, techniques can be performed using measurements of various external factors, including traffic and weather conditions. Vehicle systems can factor the friction of the underlying roads and whether a road includes precipitation or flooding when anticipating and implementing gear shifts or other behavioral changes to align with a future trajectory for a vehicle.

The following description and accompanying drawings will elucidate features of various example embodiments. The embodiments provided are by way of example, and are not intended to be limiting. As such, the dimensions of the drawings are not necessarily to scale.

Example systems within the scope of the present disclosure will now be described in greater detail. An example system may be implemented in or may take the form of an automobile. In some example embodiments, a vehicle performing disclosed techniques may be a Class 8 truck (of a gross vehicle weight rating (GVWR) over 33,000 lbs.), including, for example, tractor trailer trucks, single-unit dump trucks, as well as non-commercial chassis fire trucks. Such vehicles may generally have three or more axles. In other examples, passenger vehicles, buses, farm equipment, trolleys, and other types of vehicles may perform disclosed techniques.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. Additionally, vehicle 100 may operate in a partially autonomous (i.e., semi-autonomous) mode in which some functions of the vehicle 100 are controlled by a human driver of the vehicle 100 and some functions of the vehicle 100 are controlled by the computing system. For example, vehicle 100 may also include subsystems that enable the driver to control operations of vehicle 100 such as steering, acceleration, and braking, while the computing system performs assistive functions such as lane-departure warnings/lane-keeping assist or adaptive cruise control based on other objects (e.g., vehicles) in the surrounding environment.

As described herein, in a partially autonomous driving mode, even though the vehicle assists with one or more driving operations (e.g., steering, braking and/or accelerating to perform lane centering, adaptive cruise control, advanced driver assistance systems (ADAS), and emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

Although, for brevity and conciseness, various systems and methods are described below in conjunction with autonomous vehicles, these or similar systems and methods can be used in various driver assistance systems that do not rise to the level of fully autonomous driving systems (i.e. partially autonomous driving systems). In the United States, the Society of Automotive Engineers (SAE) have defined different levels of automated driving operations to indicate how much, or how little, a vehicle controls the driving, although different organizations, in the United States or in other countries, may categorize the levels differently. More specifically, the disclosed systems and methods can be used in SAE Level 2 driver assistance systems that implement steering, braking, acceleration, lane centering, adaptive cruise control, etc., as well as other driver support. The disclosed systems and methods can be used in SAE Level 3 driving assistance systems capable of autonomous driving under limited (e.g., highway) conditions. Likewise, the disclosed systems and methods can be used in vehicles that use SAE Level 4 self-driving systems that operate autonomously under most regular driving situations and require only occasional attention of the human operator. In all such systems, accurate lane estimation can be performed automatically without a driver input or control (e.g., while the vehicle is in motion) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

As shown in FIG. 1, vehicle 100 may include various subsystems, such as propulsion system 102, sensor system 104, control system 106, one or more peripherals 108, power supply 110, computer system 112 (which could also be referred to as a computing system) with data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within embodiments. For instance, the control system 106 and the computer system 112 may be combined into a single system that operates the vehicle 100 in accordance with various operations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, lidar 128, camera 130, steering sensor 123, and throttle/brake sensor 125, among other possible sensors. In some embodiments, sensor system 104 may also include sensors configured to monitor internal systems of the vehicle 100 (e.g., $O_2$ monitor, fuel gauge, engine oil temperature, and brake wear).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the surrounding environment of vehicle 100. As such, radar 126 may include antennas configured to transmit and receive radio signals. In some embodiments, radar 126 may correspond to a mountable radar configured to obtain measurements of the surrounding environment of vehicle 100.

Lidar 128 may include one or more laser sources, a laser scanner, and one or more detectors, among other system components, and may operate in a coherent mode (e.g., using heterodyne detection) or in an incoherent detection mode (i.e., time-of-flight mode). In some embodiments, the one or more detectors of the lidar 128 may include one or more photodetectors, which may be especially sensitive detectors (e.g., avalanche photodiodes). In some examples, such photodetectors may be capable of detecting single photons (e.g., single-photon avalanche diodes (SPADs)). Further, such photodetectors can be arranged (e.g., through an electrical connection in series) into an array (e.g., as in a silicon photomultiplier (SiPM)). In some examples, the one or more photodetectors are Geiger-mode operated devices and the lidar includes subcomponents designed for such Geiger-mode operation. Each lidar 128 may provide lidar data (e.g., point cloud data) representing measurements of the surrounding environment.

Camera 130 may include one or more devices (e.g., still camera, video camera, a thermal imaging camera, a stereo camera, and a night vision camera) configured to capture images of the surrounding environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve and a carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in the navigation of vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software (e.g., a general purpose processor such as a central processing unit (CPU), a specialized processor such as a graphical processing unit (GPU) or a tensor processing unit (TPU), an application-specific integrated circuit (ASIC), a field programmable gate array (FPGA), a volatile memory, a non-volatile memory, or one or more machine-learned models) operable to process and analyze images in an effort to determine objects that are in motion (e.g., other vehicles, pedestrians, bicyclists, or animals) and objects that are not in motion (e.g., traffic lights, roadway boundaries, speed-bumps, or potholes). As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150 (e.g., one or more interior and/or exterior microphones), and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or cellular communication, such as 4G worldwide interoperability for microwave access (WiMAX) or long-term evolution (LTE), or 5G. Alternatively, wireless communication system 146 may communicate with a wireless local area network (WLAN) using WIFI® or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include processor 113 (which could include at least one microprocessor) operable to execute instructions 115 stored in a non-transitory, computer-readable medium, such as data storage 114. As such, processor 113 can represent one or multiple processors. In some embodiments, computer system 112 may represent a plurality of computing devices that may serve to control individual components or subsystems of vehicle 100 in a distributed fashion.

In some embodiments, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, or control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of a surrounding environment of vehicle 100 operating in an autonomous or semi-autonomous mode. The state of the surrounding environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 and/or lidar 128, and/or some other environmental mapping, ranging, and/or positioning sensor system may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E show an example vehicle 200 (e.g., a fully autonomous vehicle or semi-autonomous vehicle) that can include some or all of the functions described in connection with vehicle 100 in reference to FIG. 1. Although vehicle 200 is illustrated in FIGS. 2A-2E as a van with side view mirrors for illustrative purposes, the present disclosure is not so limited. For instance, vehicle 200 can represent a truck, a car, a semi-trailer truck, a motorcycle, a golf cart, an off-road vehicle, a farm vehicle, or any other vehicle that is described elsewhere herein (e.g., buses, boats, airplanes, helicopters, drones, lawn mowers, earth movers, submarines, all-terrain vehicles, snowmobiles, aircraft, recreational vehicles, amusement park vehicles, farm equipment, construction equipment or vehicles, warehouse equipment or vehicles, factory equipment or vehicles, trams, trains, trolleys, sidewalk delivery vehicles, and robot devices).

Vehicle 200 may include one or more sensor systems 202, 204, 206, 208, 210, 212, 214, and 218. In some embodiments, sensor systems 202, 204, 206, 208, 210, 212, 214, and/or 218 could represent one or more optical systems (e.g. cameras), one or more lidars, one or more radars, one or more inertial sensors, one or more humidity sensors, one or more acoustic sensors (e.g., microphones and sonar devices), or one or more other sensors configured to sense information about an environment that is surrounding vehicle 200. In other words, any sensor system now known or later created could be coupled to vehicle 200 and/or could be utilized in conjunction with various operations of vehicle 200. As an example, a lidar could be utilized in self-driving or other types of navigation, planning, perception, and/or mapping operations of vehicle 200. In addition, sensor systems 202, 204, 206, 208, 210, 212, 214, and/or 218 could represent a combination of sensors described herein (e.g., one or more lidars and radars; one or more lidars and cameras; one or more cameras and radars; or one or more lidars, cameras, and radars).

Note that the number, location, and type of sensor systems (e.g., 202 and 204) depicted in FIGS. 2A-E are intended as a non-limiting example of the location, number, and type of such sensor systems of an autonomous or semi-autonomous vehicle. Alternative numbers, locations, types, and configurations of such sensors are possible (e.g., to comport with vehicle size, shape, aerodynamics, fuel economy, aesthetics, or other conditions, to reduce cost, or to adapt to specialized environmental or application circumstances). For example, the sensor systems (e.g., 202 and 204) could be disposed of in various other locations on the vehicle (e.g., at location 216) and could have fields of view that correspond to internal and/or surrounding environments of vehicle 200.

The sensor system 202 may be mounted atop vehicle 200 and may include one or more sensors configured to detect information about an environment that is surrounding vehicle 200, and output indications of the information. For example, sensor system 202 can include any combination of cameras, radars, lidars, inertial sensors, humidity sensors, and acoustic sensors (e.g., microphones and sonar devices). The sensor system 202 can include one or more movable mounts that could be operable to adjust the orientation of one or more sensors in the sensor system 202. In one embodiment, the movable mount could include a rotating platform that could scan sensors so as to obtain information from each direction around vehicle 200. In another embodiment, the movable mount of the sensor system 202 could be movable in a scanning fashion within a particular range of angles and/or azimuths and/or elevations. The sensor system 202 could be mounted atop the roof of a car, although other mounting locations are possible.

Additionally, the sensors of sensor system 202 could be distributed in different locations and need not be collocated in a single location. Furthermore, each sensor of sensor system 202 can be configured to be moved or scanned independently of other sensors of sensor system 202. Additionally or alternatively, multiple sensors may be mounted at one or more of sensor systems 202, 204, 206, 208, 210, 212, 214, and/or 218. For example, there may be two lidar devices mounted at a sensor location and/or there may be one lidar device and one radar mounted at a sensor location.

The one or more sensor systems 202, 204, 206, 208, 210, 212, 214, and/or 218 could include one or more lidar devices. For example, the lidar devices could include a plurality of light-emitter devices arranged over a range of angles with respect to a given plane (e.g., the x-y plane). For example, one or more of sensor systems 202, 204, 206, 208, 210, 212, 214, and/or 218 may be configured to rotate or pivot about an axis (e.g., the z-axis) perpendicular to the given plane so as to illuminate an environment that is surrounding vehicle 200 with light pulses. Based on detecting various aspects of reflected light pulses (e.g., the elapsed time of flight, polarization, and intensity), information about the surrounding environment may be determined.

In an example embodiment, sensor systems 202, 204, 206, 208, 210, 212, 214, and/or 218 may be configured to provide respective point cloud information that may relate to physical objects within the surrounding environment of vehicle 200. While vehicle 200 and sensor systems 202, 204, 206, 208, 210, 212, 214, and 218 are illustrated as including certain features, it will be understood that other types of sensor systems are contemplated within the scope of the present disclosure. Further, vehicle 200 can include any of the components described in connection with vehicle 100 of FIG. 1.

In an example configuration, one or more radars can be located on vehicle 200. Similar to radar 126 described above, the one or more radars may include antennas configured to transmit and receive radio waves (e.g., electromagnetic waves having frequencies between 30 Hz and 300 GHz). Such radio waves may be used to determine the distance to and/or velocity of one or more objects in the surrounding environment of vehicle 200. For example, one or more sensor systems 202, 204, 206, 208, 210, 212, 214, and/or 218 could include one or more radars. In some examples, one or more radars can be located near the rear of vehicle 200 (e.g., sensor systems 208 and 210), to actively scan the environment near the back of vehicle 200 for the presence of radio-reflective objects. Similarly, one or more radars can be located near the front of vehicle 200 (e.g., sensor systems 212 or 214) to actively scan the environment near the front of vehicle 200. A radar can be situated, for example, in a location suitable to illuminate a region including a forward-moving path of vehicle 200 without occlusion by other features of vehicle 200. For example, a radar can be embedded in and/or mounted in or near the front bumper, front headlights, cowl, and/or hood, etc. Furthermore, one or more additional radars can be located to actively scan the side and/or rear of vehicle 200 for the presence of radio-reflective objects, such as by including such devices in or near the rear bumper, side panels, rocker panels, and/or undercarriage, etc.

Vehicle 200 can include one or more cameras. For example, the one or more sensor systems 202, 204, 206, 208, 210, 212, 214, and/or 218 could include one or more cameras. The camera can be a photosensitive instrument, such as a still camera, a video camera, a thermal imaging camera, a stereo camera, a night vision camera, etc., that is configured to capture a plurality of images of the surrounding environment of vehicle 200. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the surrounding environment. To this end, the camera may use one or more range detecting techniques. For example, the camera can provide range information by using a structured light technique in which vehicle 200 illuminates an object in the surrounding environment with a predetermined light pattern, such as a grid or checkerboard pattern and uses the camera to detect a reflection of the predetermined light pattern from environmental surroundings. Based on distortions in the reflected light pattern, vehicle 200 can determine the distance to the points on the object. The predetermined light pattern may comprise infrared light, or radiation at other suitable wavelengths for such measurements. In some examples, the camera can be mounted inside the front windshield of vehicle 200. Specifically, the camera can be situated to capture images from a forward-looking view with respect to the orientation of vehicle 200. Other mounting locations and viewing angles of the camera can also be used, either inside or outside vehicle 200. Further, the camera can have associated optics operable to provide an adjustable field of view. Still further, the camera can be mounted to vehicle 200 with a movable mount to vary a pointing angle of the camera, such as via a pan/tilt mechanism.

Vehicle 200 may also include one or more acoustic sensors (e.g., one or more of sensor systems 202, 204, 206, 208, 210, 212, 214, 216, 218 may include one or more acoustic sensors) used to sense a surrounding environment of vehicle 200. Acoustic sensors may include microphones (e.g., piezoelectric microphones, condenser microphones, ribbon microphones, or microelectromechanical systems (MEMS) microphones) used to sense acoustic waves (i.e., pressure differentials) in a fluid (e.g., air) of the environment that is surrounding vehicle 200. Such acoustic sensors may be used to identify sounds in the surrounding environment (e.g., sirens, human speech, animal sounds, or alarms) upon which control strategy for vehicle 200 may be based. For example, if the acoustic sensor detects a siren (e.g., an ambulatory siren or a fire engine siren), vehicle 200 may slow down and/or navigate to the edge of a roadway.

Although not shown in FIGS. 2A-2E, vehicle 200 can include a wireless communication system (e.g., similar to the wireless communication system 146 of FIG. 1 and/or in addition to the wireless communication system 146 of FIG. 1). The wireless communication system may include wireless transmitters and receivers that could be configured to communicate with devices external or internal to vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

Vehicle 200 may include one or more other components in addition to or instead of those shown. The additional components may include electrical or mechanical functionality.

A control system of vehicle 200 may be configured to control vehicle 200 in accordance with a control strategy from among multiple possible control strategies. The control system may be configured to receive information from sensors coupled to vehicle 200 (on or off vehicle 200), modify the control strategy (and an associated driving behavior) based on the information, and control vehicle 200 in accordance with the modified control strategy. The control system further may be configured to monitor the information received from the sensors, and continuously evaluate driving conditions; and also may be configured to modify the control strategy and driving behavior based on changes in the driving conditions. For example, a route taken by a vehicle from one destination to another may be modified based on driving conditions. Additionally or alternatively, the velocity, acceleration, turn angle, follow distance (i.e., distance to a vehicle ahead of the present vehicle), lane selection, etc. could all be modified in response to changes in the driving conditions.

Figure 2A:
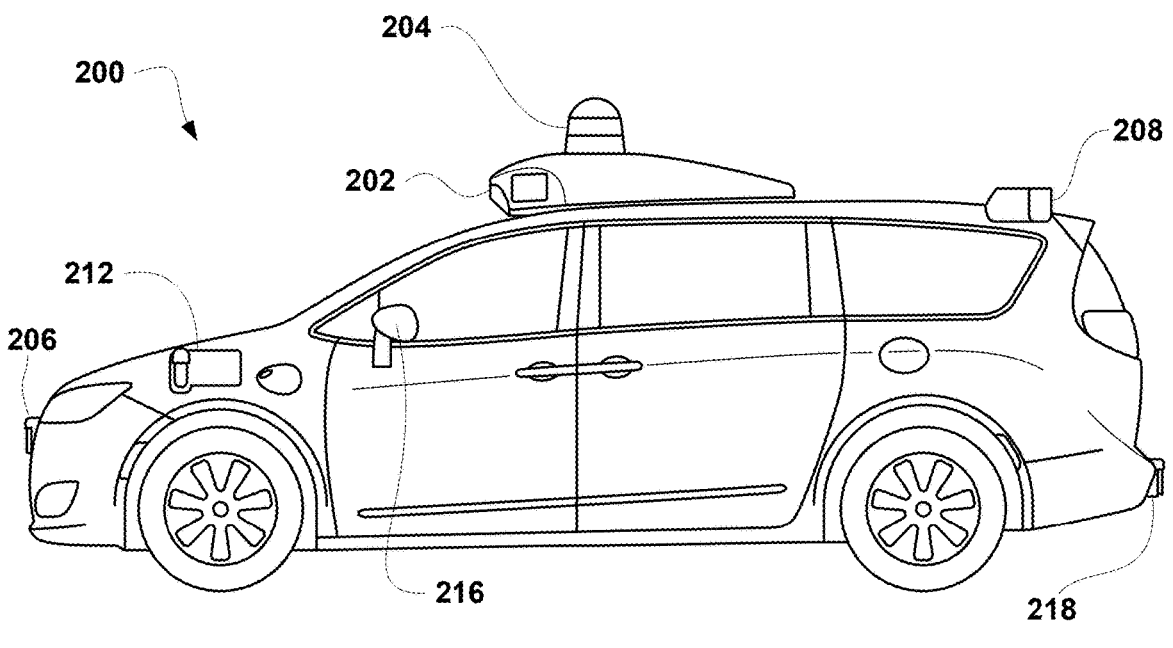
FIG. 2A is an illustration of a physical configuration of a vehicle, according to example embodiments.
Figure 2B:
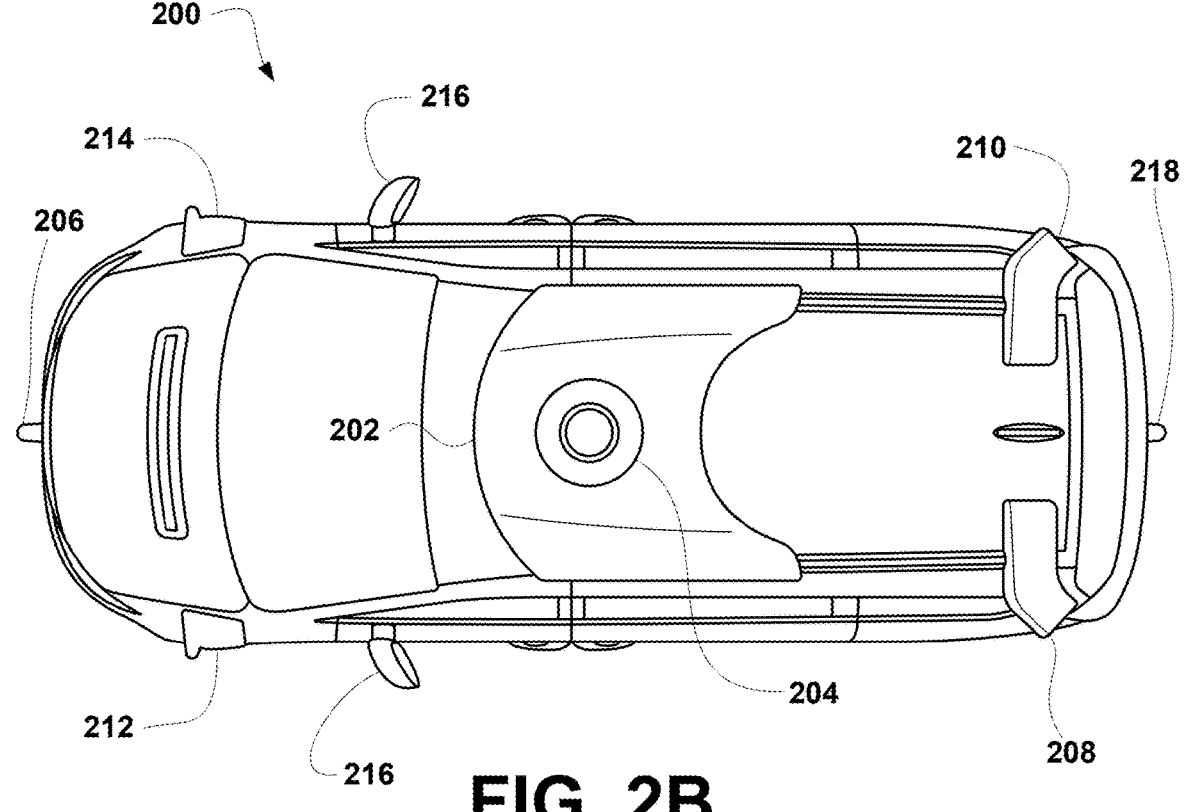
FIG. 2B is an illustration of a physical configuration of a vehicle, according to example embodiments.
Figure 2C:
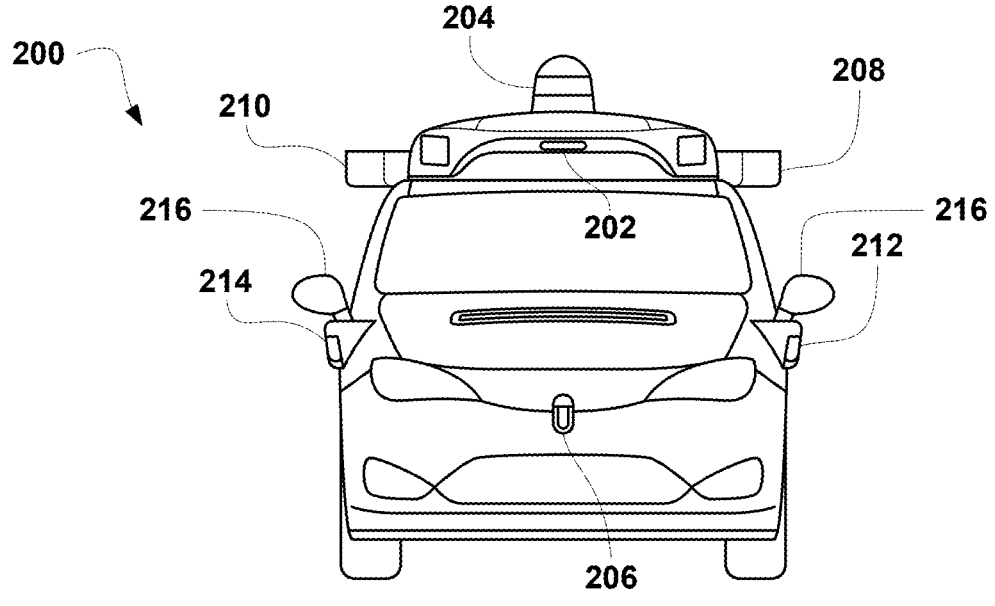
FIG. 2C is an illustration of a physical configuration of a vehicle, according to example embodiments.
Figure 2D:
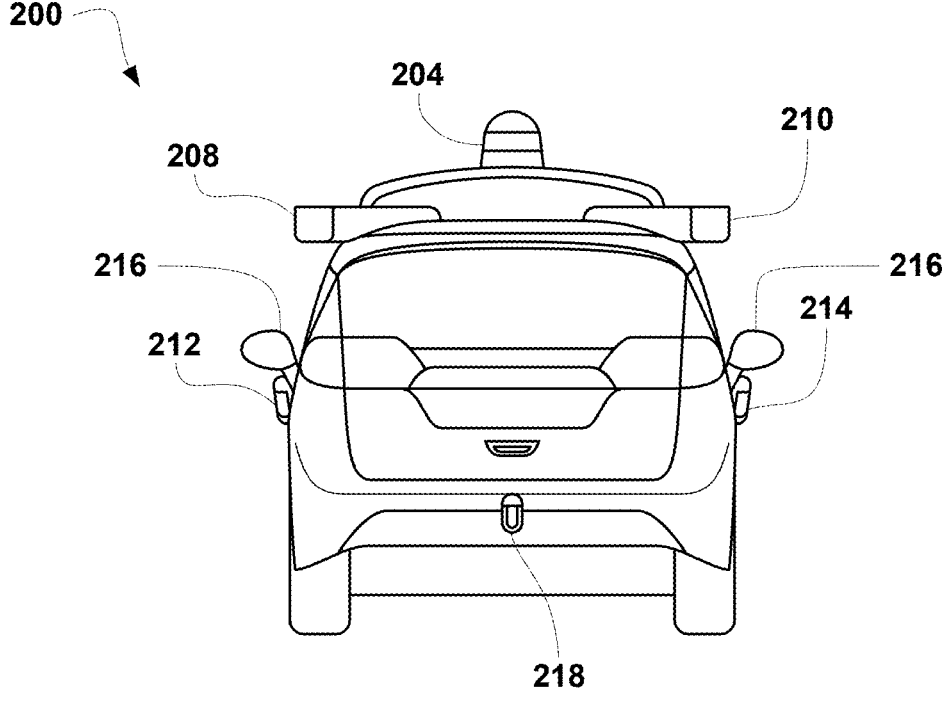
FIG. 2D is an illustration of a physical configuration of a vehicle, according to example embodiments.
Figure 2E:
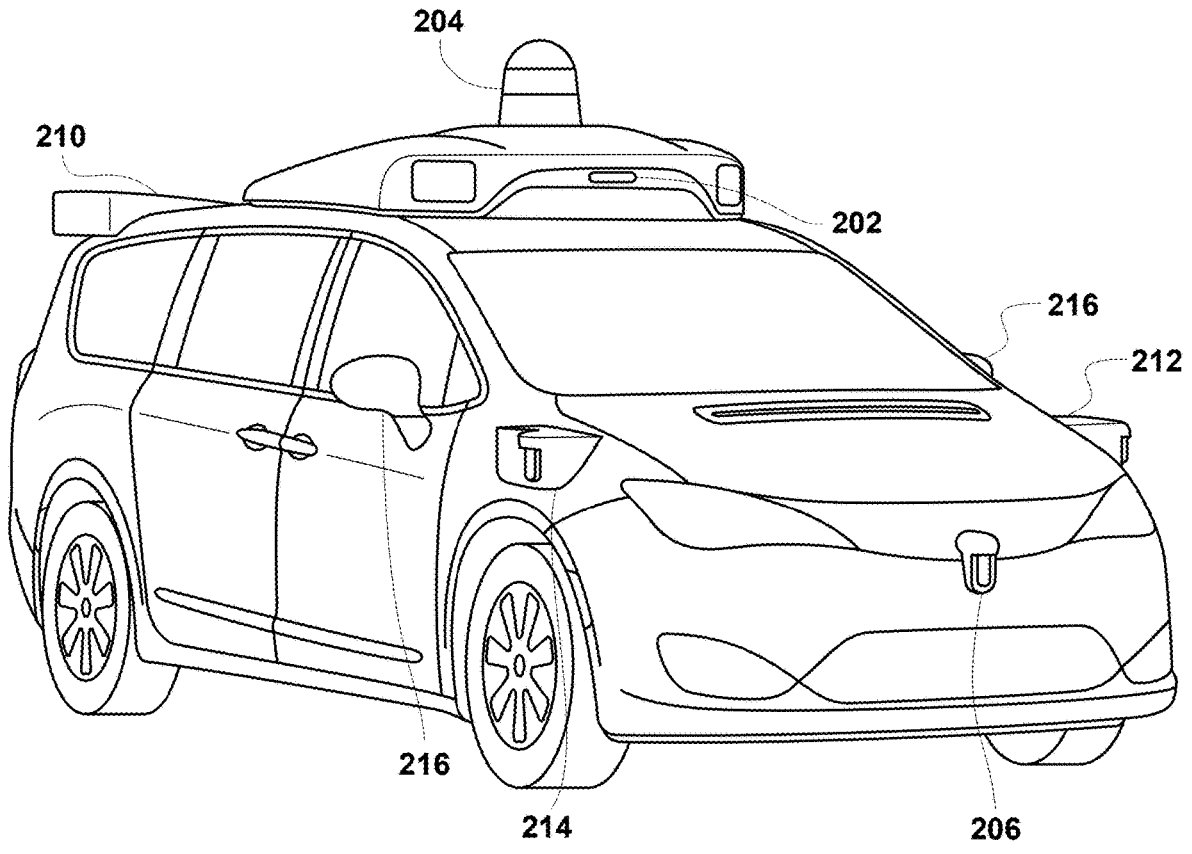
FIG. 2E is an illustration of a physical configuration of a vehicle, according to example embodiments.
Figure 2F:
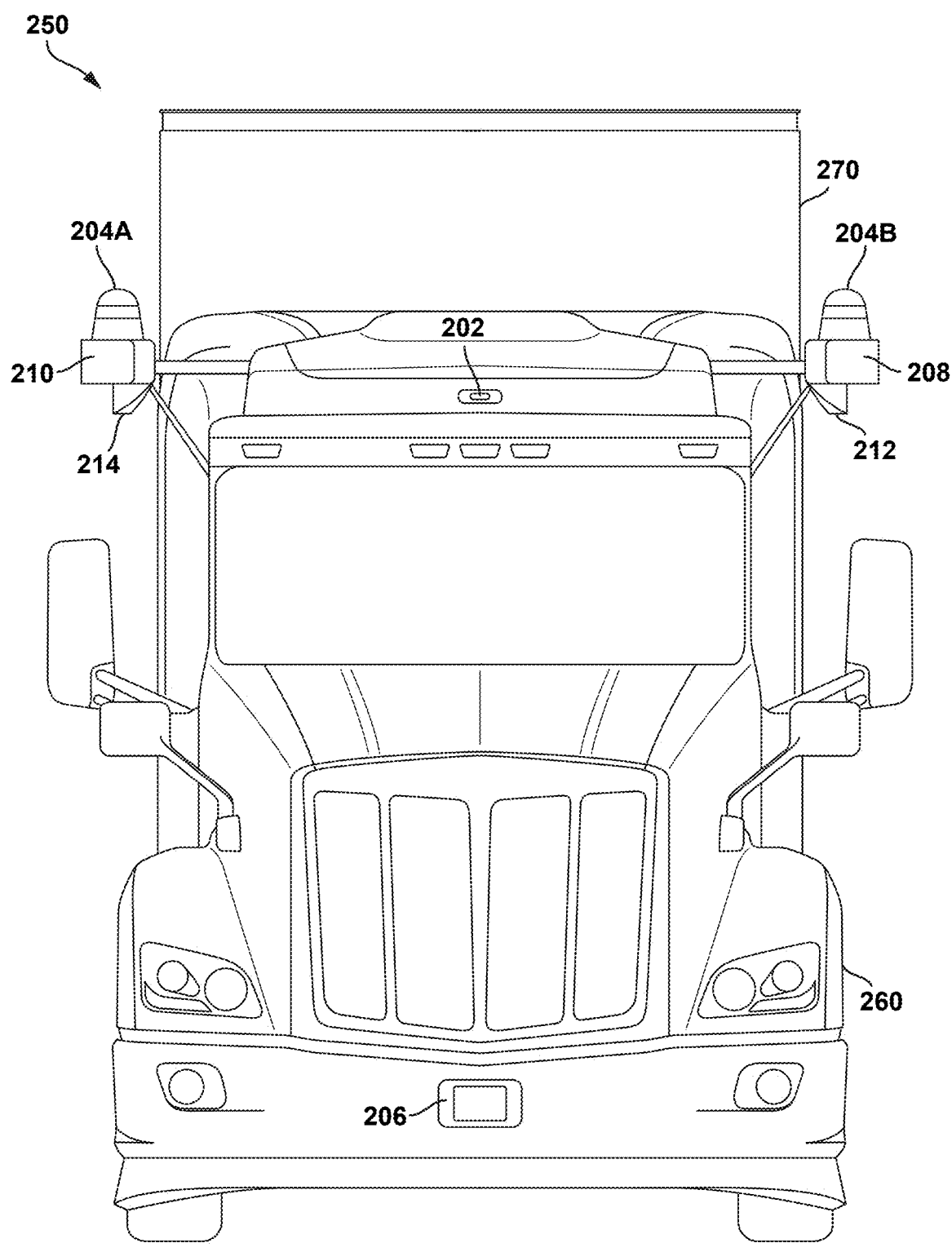
FIG. 2F is an illustration of a physical configuration of a vehicle, according to example embodiments.
Figure 2G:
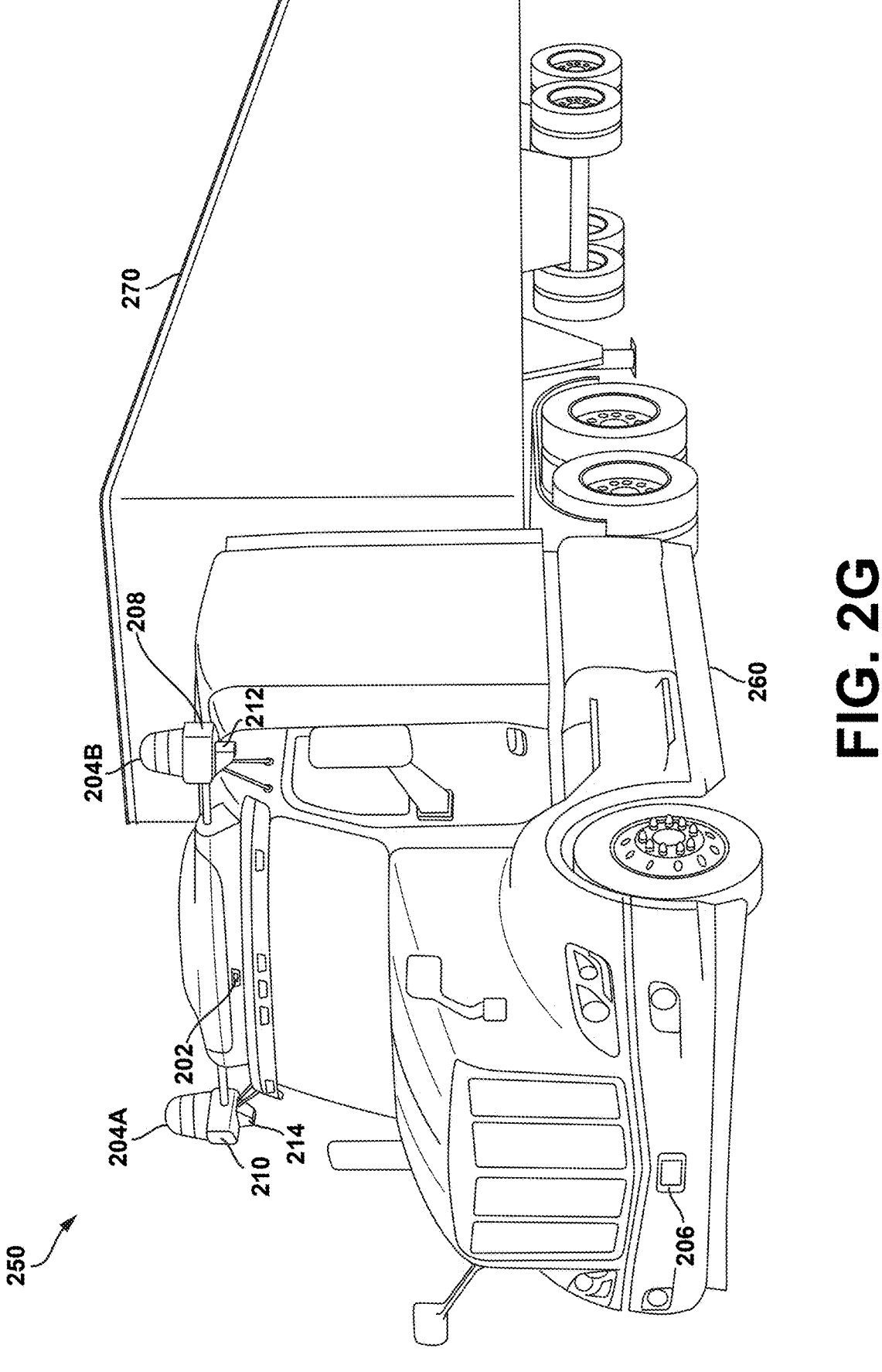
FIG. 2G is an illustration of a physical configuration of a vehicle, according to example embodiments.
Figure 2H:
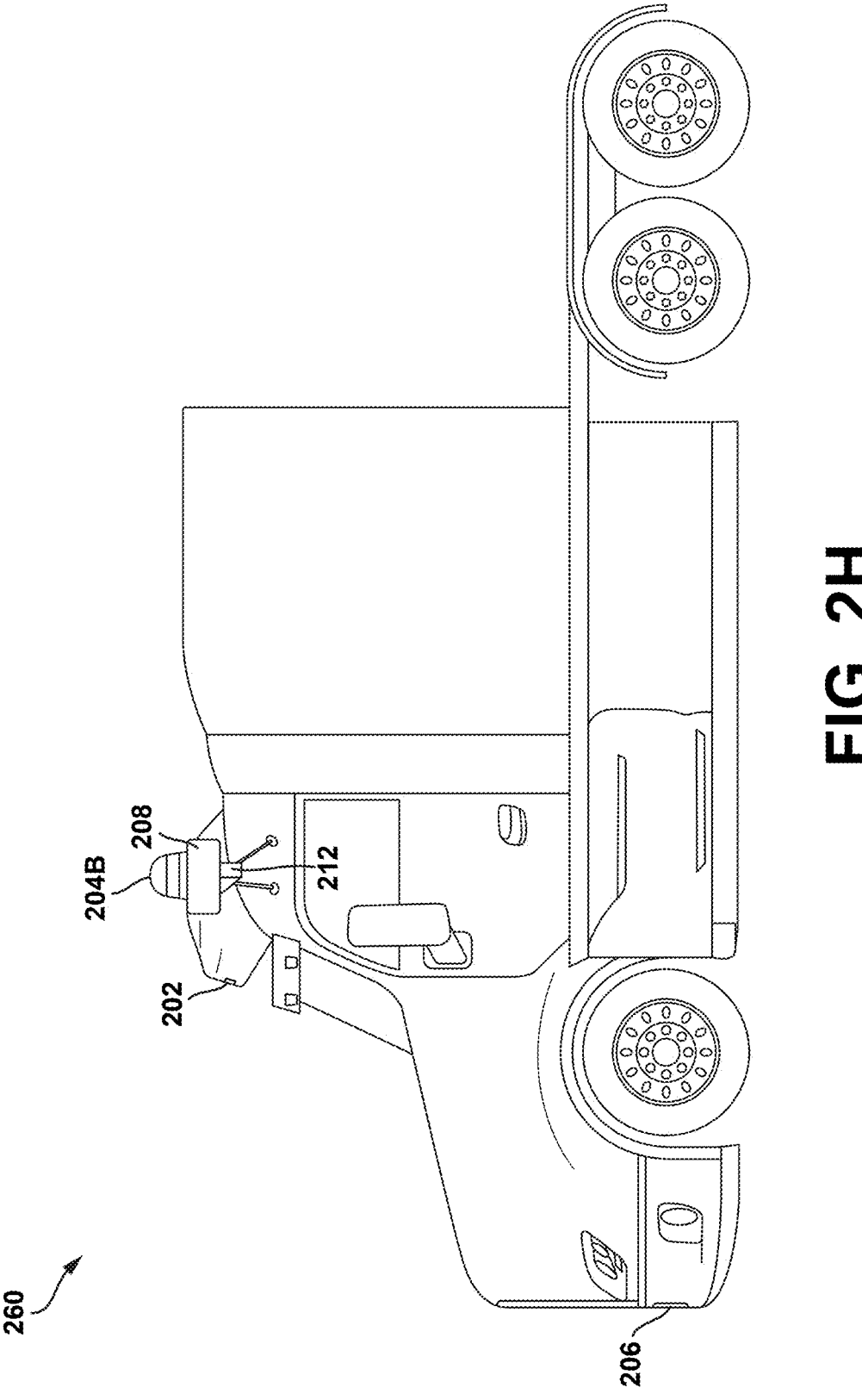
FIG. 2H is an illustration of a physical configuration of a vehicle, according to example embodiments.
Figure 2I:
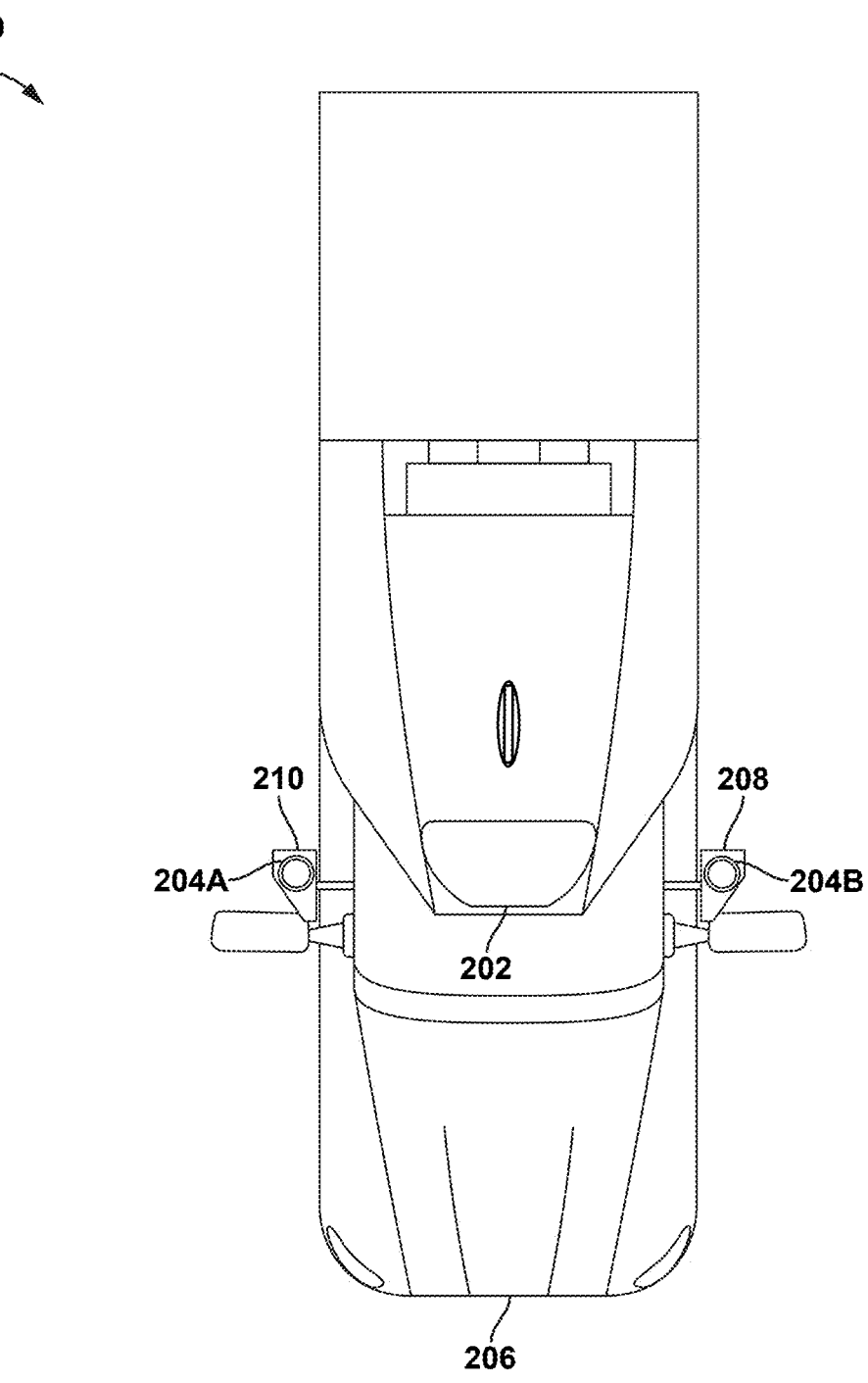
FIG. 2I is an illustration of a physical configuration of a vehicle, according to example embodiments.

As described above, in some embodiments, vehicle 200 may take the form of a van, but alternate forms are also possible and are contemplated herein. As such, FIGS. 2F-2I illustrate embodiments where vehicle 250 takes the form of a semi-truck. For example, FIG. 2F illustrates a front-view of vehicle 250 and FIG. 2G illustrates an isometric view of vehicle 250. In embodiments where vehicle 250 is a semi-truck, vehicle 250 may include tractor portion 260 and trailer portion 270 (illustrated in FIG. 2G). FIGS. 2H and 2I provide a side view and a top view, respectively, of the tractor portion 260. Similar to vehicle 200 illustrated above, vehicle 250 illustrated in FIGS. 2F-2I may also include a variety of sensor systems (e.g., similar to the sensor systems 202, 206, 208, 210, 212, 214 shown and described with reference to FIGS. 2A-2E). In some embodiments, whereas vehicle 200 of FIGS. 2A-2E may only include a single copy of some sensor systems (e.g., sensor system 204), vehicle 250 illustrated in FIGS. 2F-2I may include multiple copies of that sensor system (e.g., sensor systems 204A and 204B, as illustrated).

While drawings and description throughout may reference a given form of vehicle (e.g., semi-truck vehicle 250 or vehicle 200 shown as a van), it is understood that embodiments described herein can be equally applied in a variety of vehicle contexts (e.g., with modifications employed to account for a form factor of vehicle). For example, sensors and/or other components described or illustrated as being part of vehicle 200 could also be used (e.g., for navigation and/or obstacle detection and avoidance) in semi-truck vehicle 250

Figure 2J:
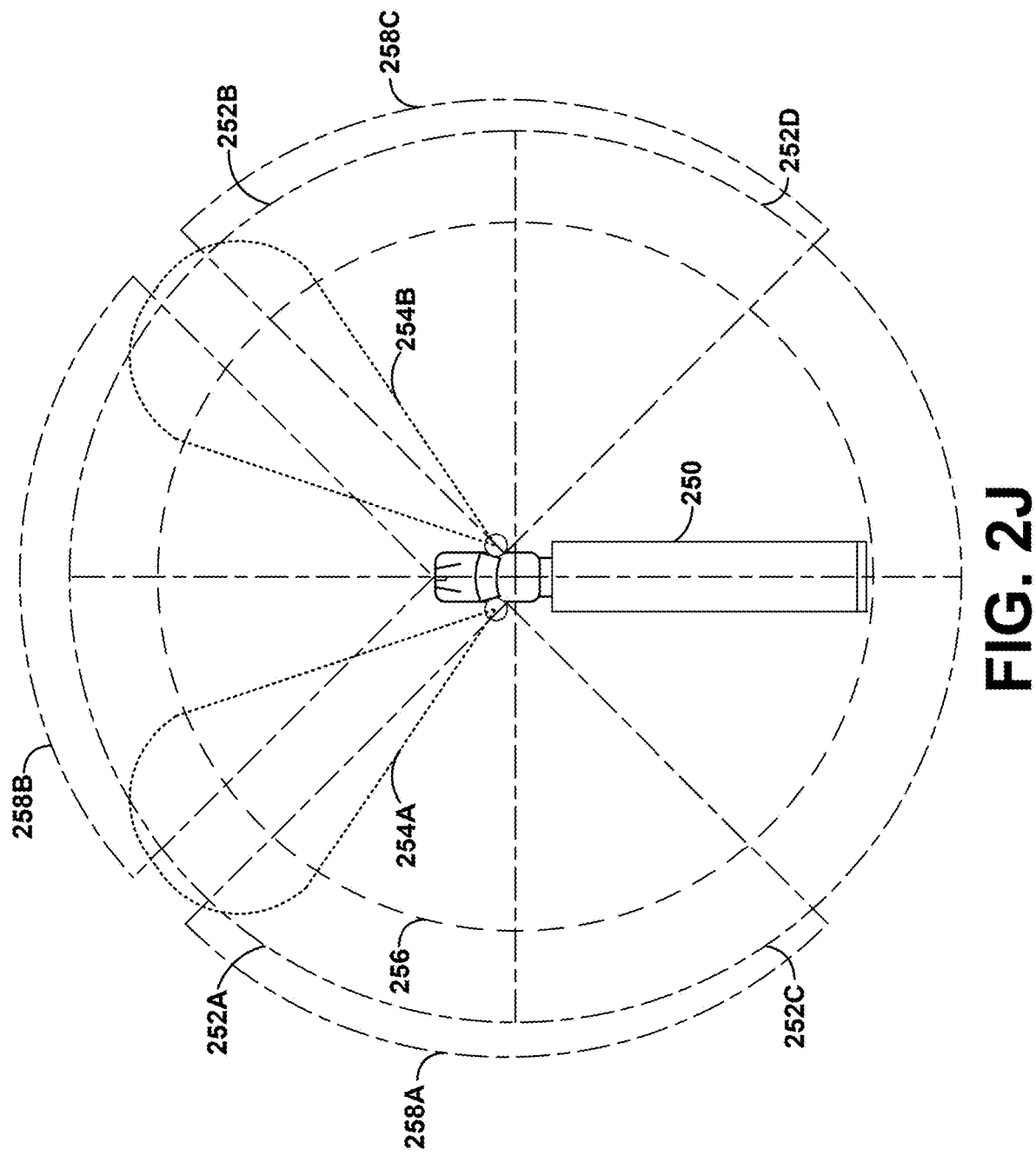
FIG. 2J is an illustration of a field of view for various sensors, according to example embodiments.

FIG. 2J illustrates various sensor fields of view (e.g., associated with vehicle 250 described above). As described above, vehicle 250 may contain a plurality of sensors/sensor units. The locations of the various sensors may correspond to the locations of the sensors disclosed in FIGS. 2F-2I, for example. However, in some instances, the sensors may have other locations. Sensors location reference numbers are omitted from FIG. 2J for simplicity of the drawing. For each sensor unit of vehicle 250, FIG. 2J illustrates a representative field of view (e.g., fields of view labeled as 252A, 252B, 252C, 252D, 254A, 254B, 256, 258A, 258B, and 258C). The field of view of a sensor may include an angular region (e.g., an azimuthal angular region and/or an elevational angular region) over which the sensor may detect objects.

Figure 2K:
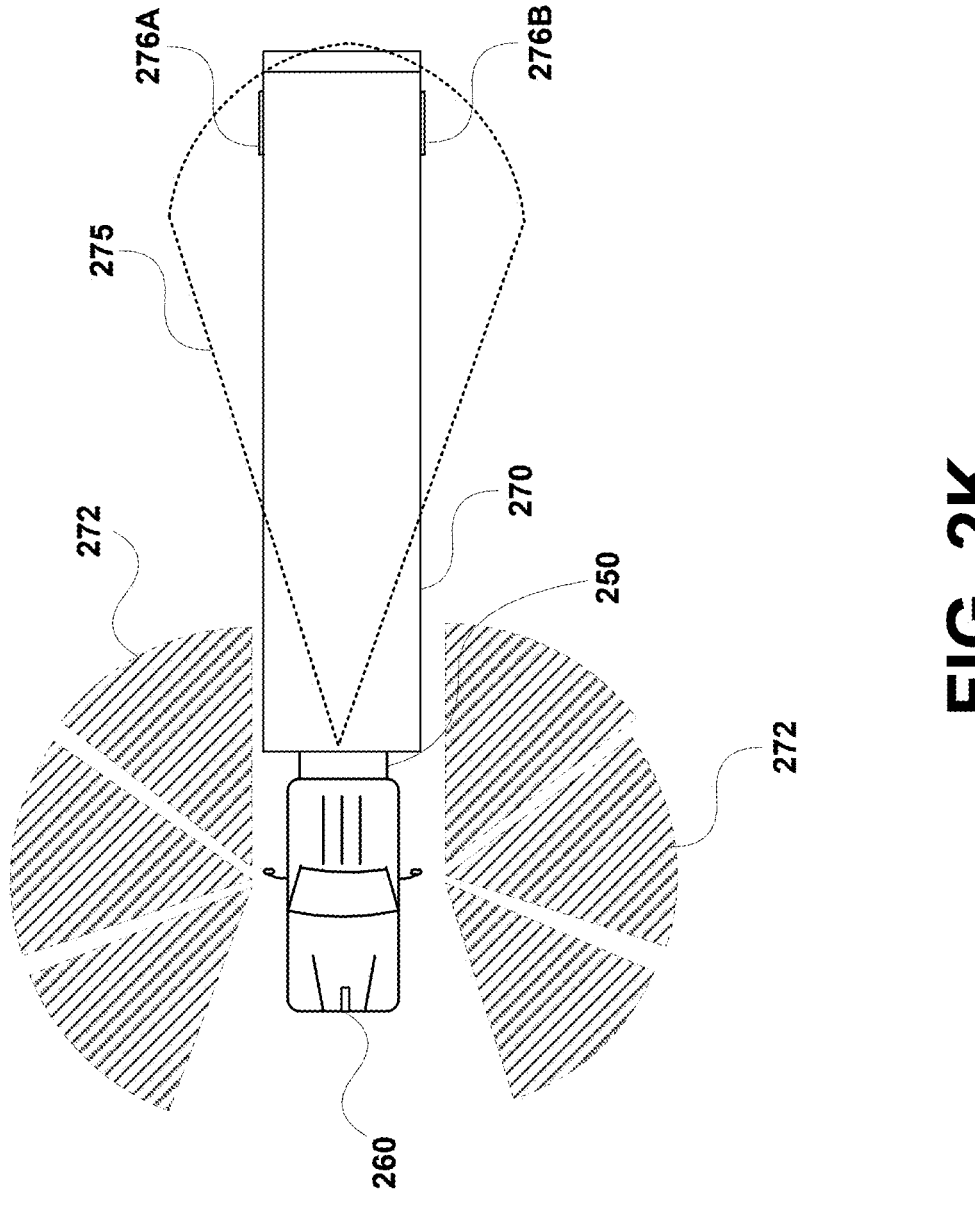
FIG. 2K is an illustration of beam steering for a sensor, according to example embodiments.

FIG. 2K illustrates beam steering for a sensor of a vehicle (e.g., vehicle 250 shown and described with reference to FIGS. 2F-2J), according to example embodiments. In various embodiments, a sensor unit of vehicle 250 may be a radar, a lidar, a sonar, etc. Further, in some embodiments, during the operation of the sensor, the sensor may be scanned within the field of view of the sensor. Various different scanning angles for an example sensor are shown as regions 272, which each indicate the angular region over which the sensor is operating. The sensor may periodically or iteratively change the region over which it is operating. In some embodiments, multiple sensors may be used by vehicle 250 to measure regions 272. In addition, other regions may be included in other examples. For instance, one or more sensors may measure aspects of the trailer 270 of vehicle 250 and/or a region directly in front of vehicle 250.

At some angles, region of operation 275 of the sensor may include rear wheels 276A, 276B of trailer 270. Thus, the sensor may measure rear wheel 276A and/or rear wheel 276B during operation. For example, rear wheels 276A, 276B may reflect lidar signals or radar signals transmitted by the sensor. The sensor may receive the reflected signals from rear wheels 276A, 276. Therefore, the data collected by the sensor may include data from the reflections off the wheel.

In some instances, such as when the sensor is a radar, the reflections from rear wheels 276A, 276B may appear as noise in the received radar signals. Consequently, the radar may operate with an enhanced signal to noise ratio in instances where rear wheels 276A, 276B direct radar signals away from the sensor.

Figure 3:
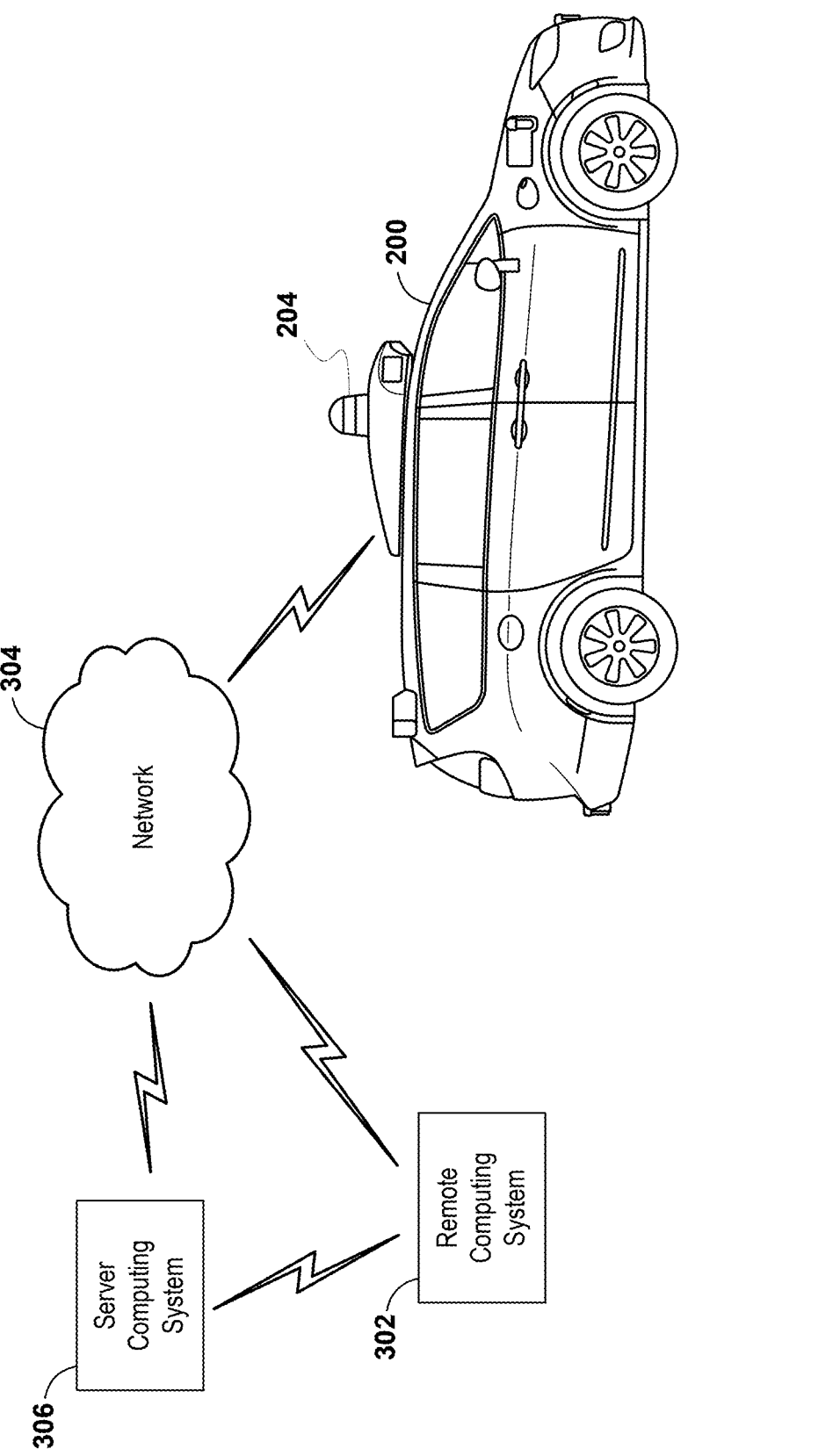
FIG. 3 is a conceptual illustration of wireless communication between various computing systems related to an autonomous or semi-autonomous vehicle, according to example embodiments.

FIG. 3 is a conceptual illustration of wireless communication between various computing systems related to an autonomous or semi-autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous or semi-autonomous mode that enables a control system to safely navigate vehicle 200 between destinations using sensor measurements. When operating in an autonomous or semi-autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, server computing system 306, or a computing system local to vehicle 200) may operate to use a camera to capture images of the surrounding environment of an autonomous or semi-autonomous vehicle. In general, at least one computing system will be able to analyze the images and possibly control the autonomous or semi-autonomous vehicle.

In some embodiments, to facilitate autonomous or semi-autonomous operation, a vehicle (e.g., vehicle 200) may receive data representing objects in an environment surrounding the vehicle (also referred to herein as "environment data") in a variety of ways. A sensor system on the vehicle may provide the environment data representing objects of the surrounding environment. For example, the vehicle may have various sensors, including a camera, a radar, a lidar, a microphone, a radio unit, and other sensors. Each of these sensors may communicate environment data to a processor in the vehicle about information each respective sensor receives.

In one example, a camera may be configured to capture still images and/or video. In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar may be configured to transmit an electromagnetic signal that will be reflected by various objects near the vehicle, and then capture electromagnetic signals that reflect off the objects. The captured reflected electromagnetic signals may enable the radar (or processing system) to make various determinations about objects that reflected the electromagnetic signal. For example, the distances to and positions of various reflecting objects may be determined. In some embodiments, the vehicle may have more than one radar in different orientations. The radar may be configured to store captured information to a memory for later processing by a processing system of the vehicle. The information captured by the radar may be environmental data.

In another example, a lidar may be configured to transmit an electromagnetic signal (e.g., infrared light, such as that from a gas or diode laser, or other possible light source) that will be reflected by target objects near the vehicle. The lidar may be able to capture the reflected electromagnetic (e.g., infrared light) signals. The captured reflected electromagnetic signals may enable the range-finding system (or processing system) to determine a range to various objects. The lidar may also be able to determine a velocity or speed of target objects and store it as environment data.

Additionally, in an example, a microphone may be configured to capture audio of the environment surrounding the vehicle. Sounds captured by the microphone may include emergency vehicle sirens and the sounds of other vehicles. For example, the microphone may capture the sound of the siren of an ambulance, fire engine, or police vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous or semi-autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the surrounding environment of the vehicle. For example, the processing system may combine data from both radar information and a captured image to determine if another vehicle or pedestrian is in front of the autonomous or semi-autonomous vehicle. In other embodiments, other combinations of sensor data may be used by the processing system to make determinations about the surrounding environment.

While operating in an autonomous mode (or semi-autonomous mode), the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously or semi-autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the surrounding environment (e.g., if there is actually a stop sign or if there is actually no stop sign present), (ii) confirm whether the vehicle's identification of the object is correct, (iii) correct the identification if the identification was incorrect, and/or (iv) provide a supplemental instruction (or modify a present instruction) for the autonomous or semi-autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this, the vehicle may analyze the environment data representing objects of the surrounding environment to determine at least one object having a detection confidence below a threshold. A processor in the vehicle may be configured to detect various objects of the surrounding environment based on environment data from various sensors. For example, in one embodiment, the processor may be configured to detect objects that may be important for the vehicle to recognize. Such objects may include pedestrians, bicyclists, street signs, other vehicles, indicator signals on other vehicles, and other various objects detected in the captured environment data.

The detection confidence may be indicative of a likelihood that the determined object is correctly identified in the surrounding environment, or is present in the surrounding environment. For example, the processor may perform object detection of objects within image data in the received environment data, and determine that at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the surrounding environment in various ways depending on the source of the environment data. In some embodiments, the environment data may come from a camera and be image or video data. In other embodiments, the environment data may come from a lidar. The vehicle may analyze the captured image or video data to identify objects in the image or video data. The methods and apparatuses may be configured to monitor image and/or video data for the presence of objects of the surrounding environment. In other embodiments, the environment data may be radar, audio, or other data. The vehicle may be configured to identify objects of the surrounding environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the surrounding environment, it may also calculate a confidence associated with the specific detected object. The confidence may be calculated in various ways depending on the embodiment. In one example, when detecting objects of the surrounding environment, the vehicle may compare environment data to predetermined data relating to known objects. The closer the match between the environment data and the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304), and in some embodiments, via a server (e.g., server computing system 306). The human operator of the remote computing system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing the velocity of the vehicle (e.g., a speed and/or direction), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object.

Figure 4:
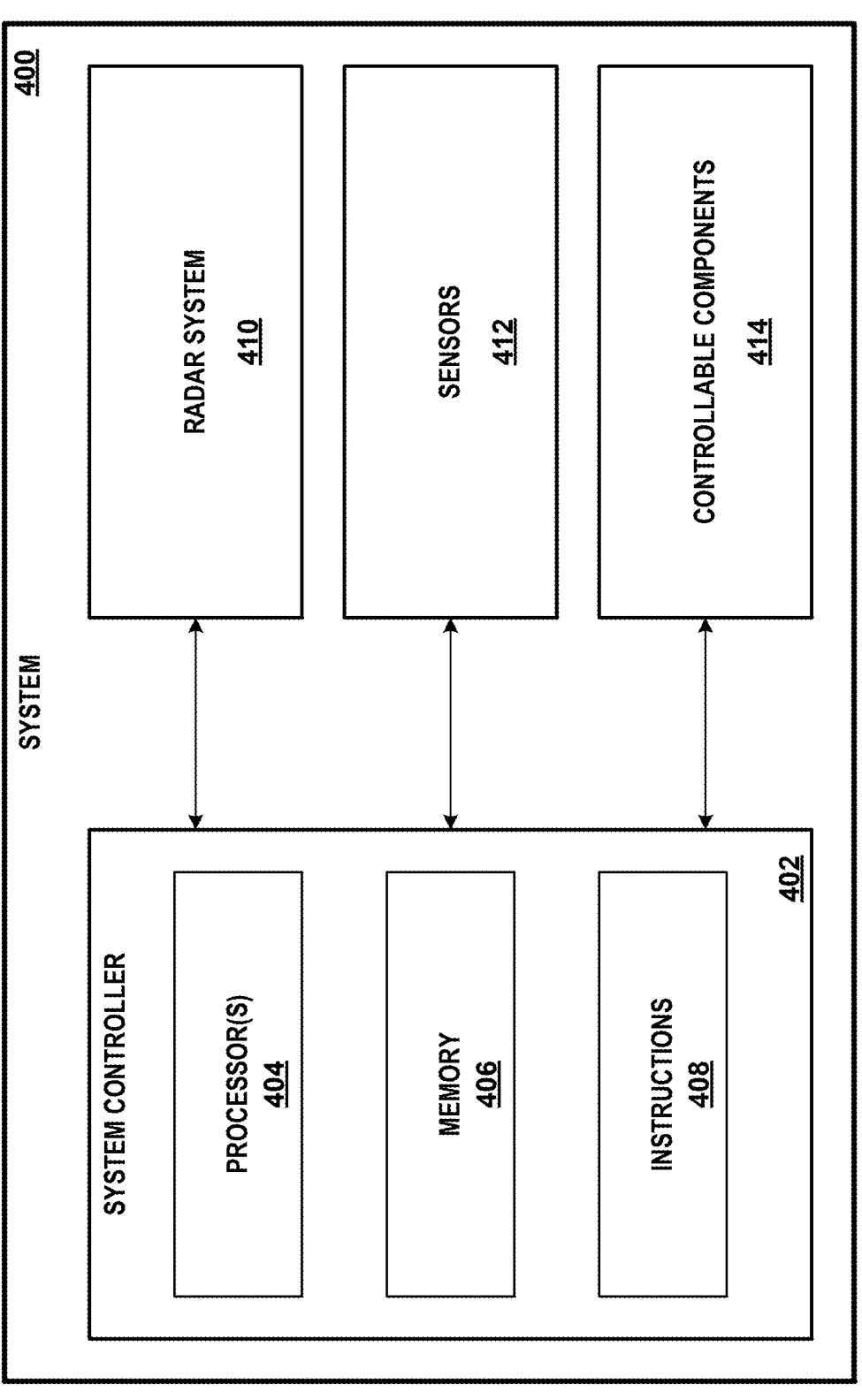
FIG. 4 is a block diagram of a system including a radar unit, according to example embodiments.

FIG. 4 is a block diagram of a system, according to example embodiments. In particular, FIG. 4 shows system 400 that includes system controller 402, radar system 410, sensors 412, and controllable components 414. System controller 402 includes processor(s) 404, memory 406, and instructions 408 stored on memory 406 and executable by processor(s) 404 to perform functions, such as the operations disclosed herein.

Processor(s) 404 can include one or more processors, such as one or more general-purpose microprocessors (e.g., having a single core or multiple cores) and/or one or more special purpose microprocessors. The one or more processors may include, for instance, one or more central processing units (CPUs), one or more microcontrollers, one or more graphical processing units (GPUs), one or more tensor processing units (TPUs), one or more ASICs, and/or one or more field-programmable gate arrays (FPGAs). Other types of processors, computers, or devices configured to carry out software instructions are also contemplated herein.

Memory 406 may include a computer-readable medium, such as a non-transitory, computer-readable medium, which may include without limitation, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc.

Radar system 410 can be used in autonomous or semi-autonomous vehicles for navigation and object detection by using radio waves to detect and measure the distance, speed, and direction of objects in the surrounding environment. Radar system 410 can include one or multiple radar units, which each consists of a radar transmitter that emits radio waves and a radar receiver that captures the reflected waves from objects. By analyzing the time it takes for the waves to return and their frequency shifts (Doppler Effect), radar system 410 can determine the presence, location, and movement of objects.

In the context of autonomous or semi-autonomous vehicles, radar system 410 provides measurements that can assist with navigation and collision avoidance. Radar units are typically mounted on the vehicle's exterior, such as the front, rear, and sides. During navigation, radar system 410 may continuously emit radio waves in various directions, scanning the environment around the vehicle. When the waves encounter an object, they bounce back to a radar receiver, thereby enabling radar system 410 to analyze the reflected waves to calculate the distance, relative speed, and angle of the object. This information can be used by the vehicle's control system to make decisions and adjust the vehicle's trajectory accordingly, enabling it to detect and react to obstacles, pedestrians, vehicles, and other potential hazards in its path. By providing real-time data about the surrounding environment, radar system 410 can enhance the vehicle's perception capabilities and contribute to safer and more reliable navigation.

Radar system 410 offers operational benefits over other types of sensors in some aspects, such as cameras and lidar. Radar can perform well in adverse weather conditions, such as rain, fog, or dust, where other sensors might be limited. In particular, radio waves emitted by radar system 410 can penetrate these adverse conditions and provide reliable object detection. This makes radar particularly useful for enhancing the robustness and safety of autonomous or semi-autonomous vehicles in various weather scenarios. In addition, radar also excels at detecting the velocity and relative speed of nearby objects, which is useful for assessing the movement of surrounding vehicles, pedestrians, and other obstacles. By providing accurate speed information, radar system 410 enables the vehicle (or a driver of the vehicle) to make informed decisions about potential collision risks and adjust its behavior accordingly. In some cases, radar system 410 can also offer a longer range of measurements and broader field of view when compared to other sensors coupled to the vehicle.

Similarly, system controller 402 may use outputs from radar system 410 and sensors 412 to determine the characteristics of system 400 and/or characteristics of the surrounding environment. For example, sensors 412 may include one or more of a GPS, an IMU, an image capture device (e.g., a camera), a light sensor, a heat sensor, one or more lidar devices, and other sensors indicative of parameters relevant to system 400 and/or the surrounding environment. Radar system 410 is depicted as separate from sensors 412 for purposes of example, and may be considered as part of or as sensors 412 in some examples.

Based on characteristics of system 400 and/or the surrounding environment determined by system controller 402 based on the outputs from radar system 410 and the sensors 412, system controller 402 may control the controllable components 414 to perform one or more actions. For example, system 400 may correspond to a vehicle, in which case the controllable components 414 may include a braking system, a turning system, and/or an accelerating system of the vehicle, and system controller 402 may change aspects of these controllable components based on characteristics determined from radar system 410 and/or sensors 412 (e.g., when system controller 402 controls the vehicle in an autonomous or semi-autonomous mode). Within examples, radar system 410 and sensors 412 are also controllable by system controller 402.

Figure 5:
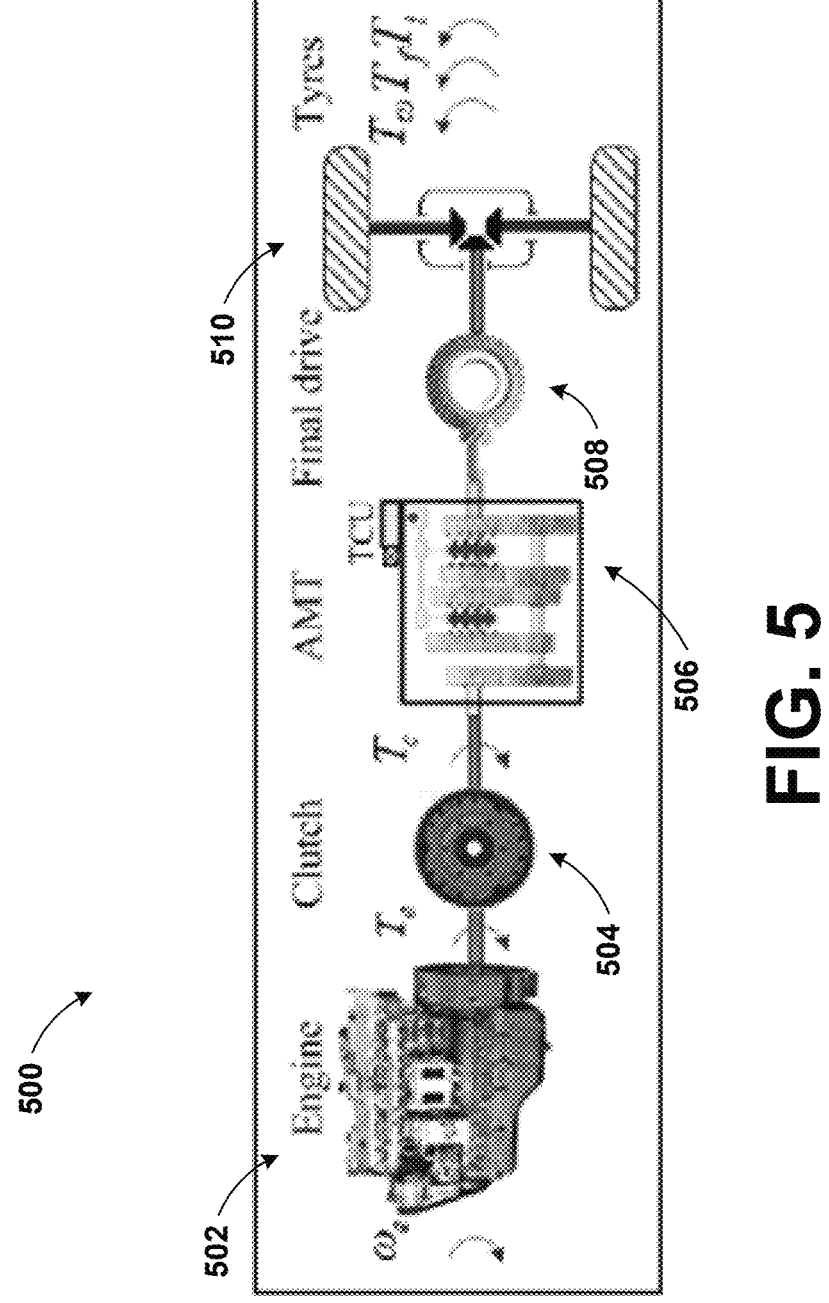
FIG. 5 depicts a gear diagram, according to example embodiments.

FIG. 5 depicts gear diagram 500, which can be used by tractor (e.g., a Class 8 truck) or another type of vehicle. In the example embodiment, gear diagram 500 includes engine 502, clutch 504, automated manual transmission (AMT) 506, final drive 508, and wheels 510. Gear diagram 500 may further include additional components not shown in FIG. 5. In addition, the quantity, type, and arrangement of the components within gear diagram 500 can differ in other examples.

Engine 502 is shown as part of gear diagram 500 and represents the primary power source for the vehicle. In some implementations, engine 502 generates mechanical power by burning fuel (e.g., diesel or gasoline) in cylinders, converting the chemical energy into rotational motion. Vehicles can have different types of engines, which may depend on the size and usage of each vehicle. Some example engines include inline engines, V engines, boxer engines, diesel engines, turbocharged engines, supercharged engines, hybrid engines, electric engines, natural gas engines, and rotary engines. In some cases, the choice of engine depends on factors, such as the vehicle's intended use, fuel efficiency requirements, power demands, and environmental considerations.

Clutch 504 represents a mechanical device within gear diagram 500 that is configured to connect and disconnect engine 502 from AMT 506. When clutch 504 is engaged, power from engine 502 is transmitted to AMT 506. When disengaged, engine 502 is decoupled from AMT 506, allowing the truck to idle or change gears. In some examples, clutch 504 consists of several parts, including the clutch pedal, clutch disc, pressure plate, flywheel, and release bearing. In some examples, clutch 504 is automated and controlled via one or more vehicle computing systems.

A driver or a vehicle computing system can operate clutch 504 using the clutch pedal or by transmitting signals that trigger similar operations as pressing the clutch pedal. When the clutch pedal pressed, it initiates the disengagement of clutch 504. The clutch disc, which is located between the flywheel and the transmission input shaft, has friction surfaces on both sides and is connected to the transmission input shaft of AMT 506. The flywheel, mounted on the crankshaft of engine 502, provides a rotating surface for the clutch disc to engage. The flywheel is a heavy, circular disc that helps maintain the rotational momentum of engine 502. When the clutch pedal is not depressed, the pressure plate applies pressure to the clutch disc, pressing it against the flywheel. This engagement links engine 502 to AMT 506, which allows power to be transmitted to wheels 510. When the driver or the vehicle computing system depresses the clutch pedal, it activates the release bearing (also called a throw-out bearing). The release bearing is positioned on the input shaft of AMT 506 and is designed to disengage the pressure plate from the clutch disc. As the release bearing is activated, it pushes against the fingers of the pressure plate, releasing the pressure on the clutch disc. This disengages clutch 504, breaking the connection between engine 502 and AMT 506. With clutch 504 disengaged, AMT 506 can be used to shift gears. Once the new gear is selected, the clutch pedal is gradually decreased causing the pressure plate to re-engage with the clutch disc and reestablish the connection between engine 502 and AMT 506. This process allows the driver or vehicle computing systems to control the power flow from engine 502 to wheels 510, facilitating smooth gear changes and efficient vehicle operation.

AMT 506 represents a type of transmission that combines the features of an automatic transmission with those of a manual transmission. In some implementations, AMT 506 uses a computerized control unit to automate clutch 504 and gear shifting processes. The control unit can act as the central intelligence, receiving real-time data from various sensors to optimize gears based on factors, such as throttle position, engine speed, and vehicle velocity. In other examples, gear diagram 500 can include another type of transmission, such as a traditional automatic transmission.

Final drive 508 includes a set of gears that transmit power from AMT 506 to wheels 510 of the vehicle. In addition, final drive 508 can be used to further reduce the speed of the rotational motion received from AMT 506 and increasing torque the rotational motion reaches wheels 510.

Wheels 510 correspond to the contact point between the vehicle and the underlying road. Wheels 510 can include tires and, in combination, provide traction as well as support the load of the vehicle. As such, wheels 510 and corresponding components (e.g., tires) contribute to the overall stability and handling of the truck.

Engine 502 initially produces rotational motion when fuel is burned in the cylinders. Clutch 504, when engaged, allows AMT 506 to receive power from engine 502. When disengaged, clutch 504 interrupts the power flow, allowing the truck to stop or change gears. AMT 506, controlled by a computing system, can automate the process of engaging and disengaging clutch 504 and shifting gears, which improves efficiency and driver comfort. AMT 506 sends power through final drive 508, which further adjusts the speed and increases torque before transmitting it to wheels 510 that transfer the rotational motion to the road, providing traction and allowing the truck to move.

Autonomous trucks and other types of vehicles can encounter various challenges during navigation when it comes to gear adjustments, particularly in scenarios demanding nuanced decision-making and adaptability. For instance, navigating heavy traffic can involve frequent stops and starts, which may compel an autonomous truck to shift gears frequently. As such, optimal gear selection can be challenging due to the potential reduction in fuel efficiency and increased wear on transmission components with constant gear changes. Similarly, abrupt shifts in road conditions, such as transitioning from a smooth highway to a rough or icy surface, can be challenging for autonomous trucks and vehicles to detect and handle. In such cases, vehicle computing systems might need to swiftly assess these conditions and determine whether to adjust gears to maintain stability and control. Additionally, navigating steep grades might require precise gear selection to balance power and prevent stalling or loss of control, which may require vehicle computing systems to anticipate changes in terrain and optimize gear performance accordingly.

Other scenarios also can cause issues for vehicle computing systems managing gear adjustments. For instance, interactions with human-driven vehicles can also introduce unpredictability. For example, abrupt lane changes, unexpected stops, or sudden accelerations by other drivers may prompt an autonomous truck to rapidly adjust gears in response to the dynamic traffic environment. Maneuvering through complex urban environments, with frequent stops, turns, and intersections, challenges vehicle computing systems to efficiently adjust gears to handle the stop-and-go nature of city driving while optimizing fuel efficiency. In addition, adverse weather conditions, such as rain, snow, or fog, can impact road conditions and traction. As such, various weather conditions can require an autonomous vehicle to adapt by adjusting gears for optimal control and to prevent wheel slippage.

Furthermore, changes in cargo weight influence the truck's performance, demanding the autonomous system to adjust gears based on the load for optimized fuel efficiency, engine performance, and overall driving dynamics. Navigating construction zones with altered road surfaces and unpredictable traffic patterns necessitates adaptive gear adjustments to ensure safety and efficiency. Autonomous trucks also need to respond appropriately to emergency situations, such as sudden obstacles or the need for evasive maneuvers, making rapid and well-timed gear changes crucial for maintaining control. In the event of a sensor or system malfunction, the autonomous truck may need to adapt its gear strategy to ensure safe operation, requiring the system to detect and respond to failures to maintain operational integrity.

Example techniques provided herein enable vehicle systems to control gear shifts based on future trajectory information and other potential parameters. Disclosed techniques can be performed by a vehicle controller and/or other computing systems located onboard a vehicle. In some examples, a vehicle computing system may communicate with external computing devices, which can include servers with databases, remote computing devices associated with remote operators, traffic signals and other infrastructure, pedestrian and passenger devices and/or other vehicles.

When analyzing the surrounding environment and the route of a vehicle in general, vehicle computing systems can obtain data from various sources, including vehicle sensors as well as external computing devices. The vehicle system can factor onboard sensor measurements along with location-based information, such as weather and traffic information, when performing disclosed techniques to determine when to adjust gears. In some cases, the vehicle system may also factor how much fuel the vehicle includes and the schedule associated with navigating the route.

By performing disclosed techniques, vehicle systems can reduce sudden acceleration and gear changes, which will limit vehicle speed drops and possible delays with the vehicle reaching the desired acceleration. The vehicle systems can adjust (or refrain from adjusting) gears to adapt vehicle speed in a manner that results in higher fuel economy and smoother acceleration.

Figure 6:
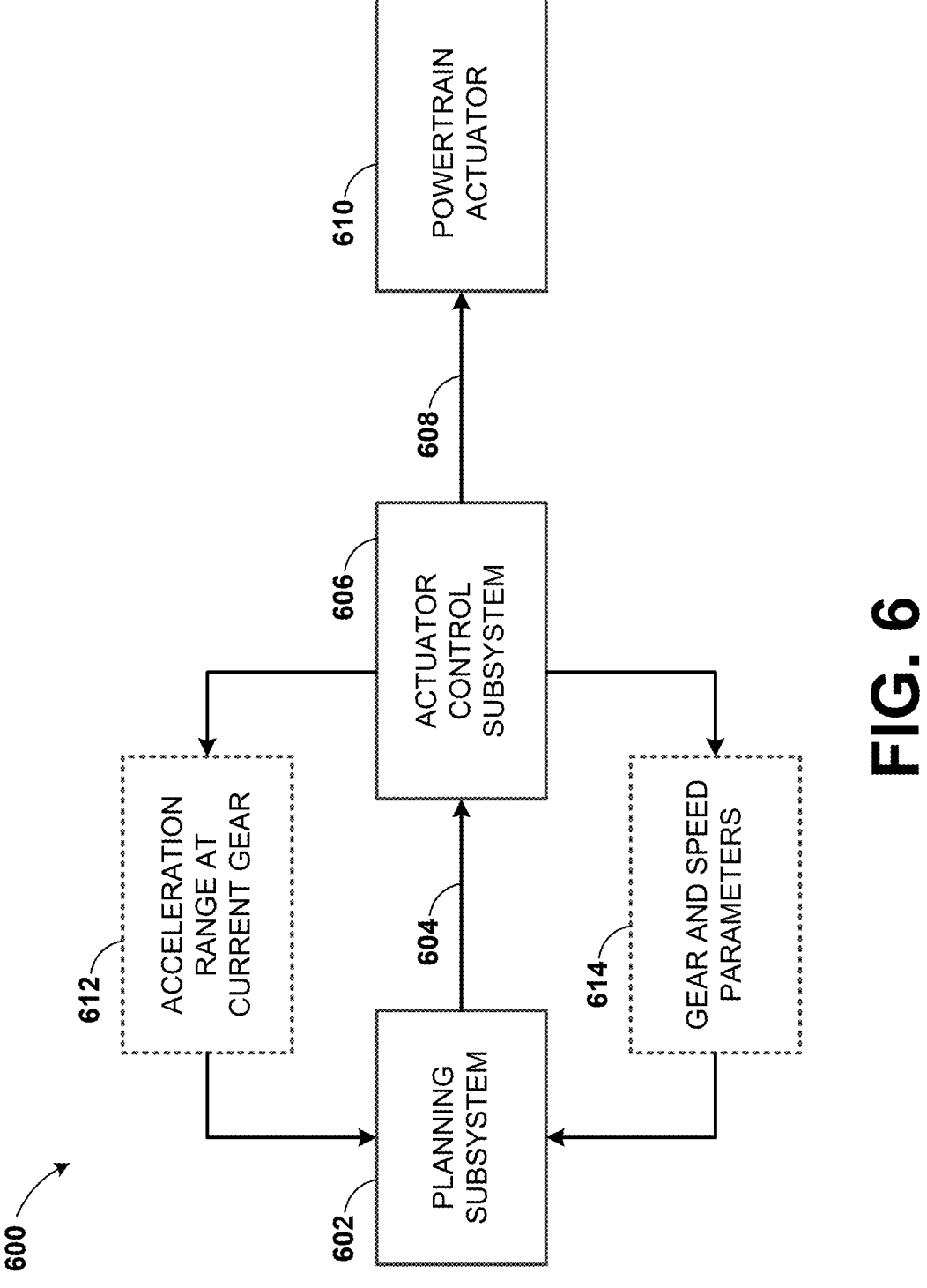
FIG. 6 is a block diagram showing a system for controlling gear shifts based on future trajectory information, according to example embodiments.

To illustrate, FIG. 6 is a block diagram showing a system for controlling gear shifts based on future trajectory information. System 600 may be used by a vehicle to optimize gear changes during navigation. As shown, system 600 includes planning subsystem 602, actuator control subsystem 606, and powertrain actuator 610. The coordination between vehicle planning subsystem 602, actuator control subsystem 606, and powertrain actuator 610 enables effective control of gears of a truck or another type of vehicle.

Vehicle planning subsystem 602, also referred to as a planner, is part of an autonomous driving system that may be responsible for making high-level decisions regarding the vehicle's movement. For instance, vehicle planning subsystem 602 can perform operations to determine the optimal speed, acceleration, and overall trajectory for the vehicle based on various factors, such as the target destination for the vehicle, traffic conditions, environmental parameters, and safety considerations. In some instances, vehicle planning subsystem 602 may also consider additional requirements for gear selection, such as whether to prioritize fuel efficiency, performance, or aim to operate at a balance between the two.

As shown in FIG. 6, vehicle planning subsystem 602 can communicate movement parameters 604 to actuator control subsystem 606 to enable actuator control subsystem 606 to perform desired actions. For instance, movement parameters 604 may include data specifying the current acceleration of the vehicle as well as a future speed or acceleration trajectory associated with navigating an upcoming portion of a route.

Actuator control subsystem 606 is a part of system 600 that receives and translates high-level decisions generated and provided by vehicle planning subsystem 602 into specific control signals for various vehicle actuators, including actuators responsible for the powertrain and the gearbox of the vehicle. For instance, actuator control subsystem 606 may execute motion control software that enables selection of a gear based on a current and a future trajectory of the vehicle. As such, actuator control subsystem 606 can receive information from vehicles sensors (e.g., speed sensors, throttle position sensors, and others) and process the sensor data to ensure that the vehicle's behavior aligns with the decisions generated by vehicle planning subsystem 602. Similarly, vehicle planning subsystem 602 can also obtain and use sensor data from vehicle sensors to generate control instructions for actuator control subsystem 606.

In the context of gear control, actuator control subsystem 606 can determine when and how to change gears based on the vehicle's current speed, load, and the instructions provided by vehicle planning subsystem 602. For instance, actuator control subsystem 606 can use current and future trajectory information to generate gear instructions 608 that are provided to powertrain actuator 610. Gear instructions 608 can include information specifying a target torque and a target gear for powertrain actuator 610 to implement. In some cases, gear instructions 608 can specify to inhibit a gear shift, increase or decrease gears, or specify a range for the gears to operate within. In addition, actuator control subsystem 606 may communicate gear and speed parameters 614 to vehicle planning subsystem 602 in some examples. Gear and speed parameters 614 may include an optimal gear for each speed and acceleration.

Powertrain actuator 610 is used with system 600 to physically engage and disengage gears within the transmission system. This is typically achieved through the control of the clutch and the selection of the appropriate gear ratio in the transmission. In an AMT system, for example, powertrain actuator 610 controls the clutch actuation and gear shifting by adjusting the engagement and disengagement of the clutch and shifts gears based on the signals received from actuator control subsystem 606. Powertrain actuator 610 can operate in tandem with the engine control system of the vehicle to ensure that gear changes are synchronized with the engine's speed and load conditions, preventing jerky transitions and optimizing performance and efficiency.

During operation, vehicle planning subsystem 602 can communicate the desired speed and driving conditions to actuator control subsystem 606. Actuator control subsystem 606 can then process the information, considering real-time data from various sensors, and determine the optimal strategy for gear selection. Powertrain actuator 610 receives signals from actuator subsystem 606 and physically adjusts the transmission, engaging or disengaging the clutch and shifting gears as needed. Collaboration ensures that the vehicle operates in a manner that aligns with the high-level planning decisions while optimizing for factors such as fuel efficiency, performance, and overall driving experience. The seamless interaction between these components is essential for achieving smooth and efficient gear control in a vehicle as the vehicle autonomously navigates dynamic environments.

In some scenarios, system 600 is used by vehicle systems to determine a correct gear (e.g., a lower gear) before initiating a passing maneuver. Vehicle planning subsystem 602 can optimize the target gear based on future anticipated torque demand and then command the acceleration trajectory to actuator control subsystem 606. In other scenarios, vehicle planning subsystem 602 may determine that an upcoming navigation situation does not necessitate a gear change, triggering system 600 to refrain from performing a gear shift and instead maintaining a current gear on the transmission based on future trajectory needs of speed and acceleration predicted for the situation. By maintaining the current gear, system 600 can avoid unnecessary gear shifts that may impact fuel efficiency and the smoothness of the overall navigation. As such, vehicle planning subsystem 602 may select the acceleration demand based on future trajectory needs and eliminate the need for gear shift. Vehicle planning subsystem 602 may change vehicle behavior to meet gear shifting needs. For instance, vehicle planning subsystem 602 may determine that increasing or decreasing acceleration in advance of an upcoming situation can eliminate the need for a gear shift or make it easier for the vehicle to shift gears for the upcoming situation. In some cases, actuator control subsystem 606 may communicate acceleration range at current gear 612 to vehicle planning subsystem 602.

System 600 may also enable vehicle systems to select a correct gear and a desired acceleration that does trade-off between a number of gear shifts and acceleration time of the planned trajectory. For instance, actuator control subsystem 606 may communicate correct gear for each speed and acceleration 614 to vehicle planning subsystem 602, which can use the information to further determine a control strategy that can be implemented via components within system 600.

System 600 can enable vehicle systems to limit vehicle speed drops and possible delay in getting to desired acceleration (due to unexpected gearshift) and enabling smooth vehicle speed. In addition, system 600 can produce higher fuel economy by avoiding the vehicle speed drop. In some instances, system 600 allows vehicle systems to avoid a gear downshift, which would require a future gear up-shift when vehicle speed stabilizes helping to increase fuel economy and smooth vehicle speed.

FIG. 7 is a flowchart of a method for controlling gear shifts based on future trajectory information. Method 700 may include one or more operations, functions, or actions as illustrated by one or more of blocks 702, 704, 706, 708 and 710. Although the blocks are illustrated in a sequential order, these blocks may be performed in parallel in some instances, and/or in a different order than those described herein. Also, the various blocks may be combined into fewer blocks, divided into additional blocks, and/or removed based upon the desired implementation.

In addition, for method 700 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. In some examples, a remote computing system performs method 700. In other examples, onboard vehicle systems can perform method 700. Similarly, other types of computing devices and systems can be programmed to perform method 700.

At block 702, method 700 involves receiving, at a computing system coupled to a vehicle, sensor data representing an environment of the vehicle during autonomous navigation of a path. The sensor data is received from at least one sensor coupled to the vehicle. The computing system may receive sensor data from one or multiple types of sensors, which can include cameras, lidar, radar, ultrasonic sensors, and IMUs, etc.

At block 704, method 700 involves determining, based on the sensor data, the vehicle is approaching a predefined situation positioned along the path. Example predefined situations include, but are not limited to, changes in road grades, changes in weather or road conditions, passing or other movements relative to other vehicles, and starting from a stop.

At block 706, method 700 involves estimating a future acceleration or speed associated with navigation of the predefined situation by the vehicle. The computing system can integrate data from the vehicle sensors (and potentially other sources) to create a comprehensive understanding of its environment. The computing system may then use machine learning algorithms and predictive modeling to estimate future acceleration or speed needed for safe navigation of upcoming situations positioned along the vehicle's route. For example, if the vehicle detects an obstacle in its path, the computing system may calculate the necessary acceleration or deceleration to avoid a collision.

At block 708, method 700 involves determining, based on the future acceleration or speed and a current acceleration of the vehicle, whether to perform a gear shift prior to navigation of the predefined situation by the vehicle. In some cases, the computing system may determine the current gear is suitable for navigation of the predefined situation by the vehicle. In other cases, the computing system may determine that navigation of the predefined situation requires a lower gear than a current gear of the vehicle.

In some examples, the computing system determines the vehicle should perform the gear shift prior to navigation of the predefined situation by the vehicle and then causes the vehicle to perform the gear shift at least a threshold distance prior to the predefined situation. The computing system can analyze various factors when determining whether to perform the gear shift in addition to the future acceleration or speed and a current acceleration of the vehicle. For instance, the computing system may factor the weather, a load weight of a trailer, wind speed, tire inflation level, fuel level, and/or future route maneuvers, etc.

In some examples, the computing system may determine a future gear based on estimating the future acceleration or speed associated with navigation of the predefined situation. The computing system may then determine whether to perform the gear shift prior to navigation of the predefined situation by the vehicle based on the future gear.

At block 710, method 700 involves controlling the vehicle based on determining whether to perform the gear shift prior to navigation of the predefined situation. For instance, the computing system may cause the vehicle to adjust gears or maintain its current gear as the vehicle proceeds to navigate the predefined situation. In some examples, the computing system may determine a future gear for use during navigation of the predefined situation based on detecting the precipitation on the upcoming portion of road.

In some examples, the vehicle is a truck-tractor pulling a trailer. The computing system may determine whether to perform the gear shift prior to navigation of the predefined situation further based on a load weight of the trailer.

In some examples, the computing system determines that an upcoming portion of road positioned along the path has a change of grade and then estimates the future acceleration or speed based on the change of grade of the upcoming portion of the road. For instance, the computing system may determine the change of grade of the upcoming portion of road is above a threshold grade change and estimate the future acceleration or speed responsive to determining the change of grade of the upcoming portion of road is above the threshold grade change. In some cases, the computing system estimates a degree of the upcoming portion of road and then estimates, using a model, the future acceleration or speed associated with navigation of the predefined situation by the vehicle based on the estimated degree of grade of the upcoming portion of the road. The model can associate vehicle speeds and degrees with different grades of roads. In some examples, the model also factors the weight of the load if the vehicle is pulling a trailer.

In some examples, the computing system detects a second vehicle (or multiple vehicles) positioned in front of the vehicle along the path of the vehicle. The computing system may then determine a control strategy for the vehicle that involves performing a pass maneuver around the second vehicle (or multiple vehicles). The pass maneuver can involve moving into a different lane to accelerate and pass the other vehicle. In some instances, the pass maneuver may also involve accelerating at least a threshold distance to pass the other vehicle and then causing the vehicle to transition back to the original lane in front of the vehicle. As such, the computing system may estimate a speed of the second vehicle and determine a first difference between the speed of the second vehicle and a current speed of the vehicle. The computing system may also estimate the future acceleration or speed associated with performing the pass maneuver around the second vehicle. In some examples, the computing system may determine a second difference between a current acceleration and speed of the vehicle and the future acceleration or speed for performing the pass maneuver and then determine whether to perform the gear shift based on the second difference.

In some examples, the computing system may determine the predefined situation involves navigation on an entry or exit ramp to a freeway or highway. The predefined situation can also involve navigation during adverse conditions, such as during snow, rain, or other precipitation that can impact the slickness of the underlying roads. Similarly, roads that experience flooding (e.g., a flooded underpass) or other conditions that impact navigation can also result in the computing system performing disclosed techniques.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid state drive, or another storage medium.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:

receiving, at a computing system coupled to a vehicle, sensor data representing an environment of the vehicle during autonomous navigation of a path, wherein the sensor data is received from at least one sensor coupled to the vehicle;

determining, based on the sensor data, the vehicle is approaching a predefined situation positioned along the path that has a change of grade above a threshold grade change;

estimating a future acceleration or speed and a future gear associated with navigation of the predefined situation by the vehicle;

determining, based on the estimated future acceleration or speed and the future gear associated with navigation of the predefined situation and a current acceleration of the vehicle, whether a current gear is capable of navigation of the predefined situation to avoid performing a gear shift prior to navigation of the predefined situation by the vehicle; and controlling the vehicle based on determining whether to perform the gear shift prior to navigation of the predefined situation, including maintaining the current gear based on determining the current gear is capable of navigation of the predefined situation.

2. The method of claim 1, further comprising:

detecting precipitation on an upcoming portion of road; and determining a future gear for use during navigation of the predefined situation based on detecting the precipitation on the upcoming portion of road.

3. The method of claim 1, wherein determining whether to perform the gear shift prior to navigation of the predefined situation by the vehicle comprises:

determining the vehicle should perform the gear shift prior to navigation of the predefined situation by the vehicle;

selecting the future gear based on determining the vehicle should perform the gear shift; and causing the vehicle to shift to the future gear at least a threshold distance prior to navigation of the predefined situation.

4. The method of claim 1, wherein determining the vehicle is approaching the predefined situation positioned along the path comprises:

detecting a second vehicle positioned in front of the vehicle along the path of the vehicle; and determining a control strategy for the vehicle that involves performing a pass maneuver around the second vehicle.

5. The method of claim 4, wherein estimating the future acceleration or speed associated with navigation of the predefined situation by the vehicle comprises:

estimating a speed of the second vehicle;

determining a first difference between the speed of the second vehicle and a current speed of the vehicle; and estimating the future acceleration or speed associated with performing the pass maneuver around the second vehicle based on the first difference.

6. The method of claim 1, wherein the predefined situation comprises:

navigation on an entry or exit ramp corresponding to a freeway.

7. The method of claim 1, further comprising:

adjusting a current speed or the current acceleration of the vehicle based on estimating a future gear for use during navigation of the predefined situation.

8. The method of claim 1, wherein receiving sensor data representing the environment of the vehicle comprises:

receiving lidar data from a lidar coupled to the vehicle.

9. The method of claim 1, wherein the vehicle is a truck-tractor pulling a trailer.

10. The method of claim 9, wherein determining whether to perform the gear shift prior to navigation of the predefined situation by the vehicle comprises:

determining whether to perform the gear shift prior to navigation of the predefined situation further based on a load weight of the trailer.

11. The method of claim 1, wherein determining whether to perform the gear shift comprises:

determining that navigation of the predefined situation requires a lower gear than a current gear of the vehicle.

12. A vehicle comprising:

a sensor;

a computing device configured to:

receive sensor data representing an environment of the vehicle during autonomous navigation of a path, wherein the sensor data is received from at least one sensor coupled to the vehicle;

determine, based on the sensor data, the vehicle is approaching a predefined situation positioned along the path that has a change of grade above a threshold grade change;

estimate a future acceleration or speed and a future gear associated with navigation of the predefined situation by the vehicle;

determine, based on the estimated future acceleration or speed and the future gear associated with navigation of the predefined situation and a current acceleration of the vehicle, whether a current gear is capable of navigation of the predefined situation to avoid performing a gear shift prior to navigation of the predefined situation by the vehicle; and control the vehicle based on determining whether to perform the gear shift prior to navigation of the predefined situation, including maintaining the current gear based on determining the current gear is capable of navigation of the predefined situation.

13. The vehicle of claim 12, wherein the computing device is further configured to:

determine whether to perform the gear shift based on a fuel level of the vehicle.

14. The vehicle of claim 12, wherein the vehicle is a truck pulling a trailer, and wherein the computing device is further configured to:

determine whether to perform the gear shift based on a load weight of the trailer.

15. The vehicle of claim 12, wherein the computing device is configured to determine that navigation of the predefined situation requires a higher gear than a current gear of the vehicle.

16. A non-transitory computer-readable medium configured to store instructions, that when executed by a computing system comprising one or more processors, causes the computing system to perform operations comprising:

receiving sensor data representing an environment of a vehicle during autonomous navigation of a path, wherein the sensor data is received from at least one sensor coupled to the vehicle;

determining, based on the sensor data, the vehicle is approaching a predefined situation positioned along the path that has a change of grade above a threshold grade change;

estimating a future acceleration or speed and a future gear associated with navigation of the predefined situation by the vehicle;

determining, based on the estimated future acceleration or speed and the future gear associated with navigation of the predefined situation and a current acceleration of the vehicle, whether a current gear is capable of navigation of the predefined situation to avoid performing a gear shift prior to navigation of the predefined situation by the vehicle; and controlling the vehicle based on determining whether to perform the gear shift prior to navigation of the predefined situation, including maintaining the current gear based on determining the current gear is capable of navigation of the predefined situation.

17. The method of claim 1, wherein estimating the future acceleration or speed and the future gear associated with navigation of the predefined situation by the vehicle comprises using a machine learning algorithm to predict the future acceleration or speed and the future gear based on the sensor data.

18. The method of claim 1, further comprising: determining whether to perform the gear shift prior to navigation of the predefined situation further based on a wind speed.

19. The method of claim 1, further comprising: determining whether to perform the gear shift prior to navigation of the predefined situation further based on a tire inflation level.

20. The method of claim 1, further comprising: determining whether to perform the gear shift prior to navigation of the predefined situation further based on future route maneuvers.

* * * * *